US006088758A

United States Patent [19]
Kaufman et al.

[11] Patent Number: 6,088,758
[45] Date of Patent: Jul. 11, 2000

[54] METHOD AND APPARATUS FOR DISTRIBUTING DATA IN A DIGITAL DATA PROCESSOR WITH DISTRIBUTED MEMORY

[75] Inventors: Mark A. Kaufman, Brighton; Fernando Oliveira, Framingham, both of Mass.

[73] Assignee: Sun Microsystems, Inc., Palo Alto, Calif.

[21] Appl. No.: 08/461,167

[22] Filed: Jun. 5, 1995

Related U.S. Application Data

[63] Continuation of application No. 07/763,132, Sep. 20, 1991, abandoned.

[51] Int. Cl.[7] ................................... G06F 13/00
[52] U.S. Cl. ..................... 711/100; 711/118; 711/117; 711/209; 711/145; 709/213; 709/216
[58] Field of Search .................. 395/444, 474, 395/479, 480, 481, 483, 490, 401, 404, 406, 419; 711/100, 118, 4, 5, 117, 147, 152, 153, 154, 163, 219, 145, 209, 6, 156; 709/213, 214, 215, 216

[56] References Cited

U.S. PATENT DOCUMENTS

| Re. 28,811 | 5/1976 | Pierce | 370/405 |
|---|---|---|---|
| 3,713,096 | 1/1973 | Comfort et al. | 709/251 |
| 3,723,976 | 3/1973 | Alvarez et al. | 711/207 |
| 3,731,002 | 5/1973 | Pierce | 370/237 |
| 3,735,362 | 5/1973 | Ashany et al. | 710/130 |
| 3,748,647 | 7/1973 | Ashany et al. | 710/130 |
| 3,800,291 | 3/1974 | Cocke et al. | 711/202 |
| 4,011,545 | 3/1977 | Nadir | 709/200 |
| 4,031,512 | 6/1977 | Faber | 340/825.05 |
| 4,077,059 | 2/1978 | Cordi et al. | 711/122 |
| 4,141,067 | 2/1979 | McLagan | 711/141 |
| 4,240,143 | 12/1980 | Besemer et al. | 710/104 |
| 4,245,306 | 1/1981 | Besemer et al. | 709/245 |
| 4,293,910 | 10/1981 | Flusche et al. | 711/157 |
| 4,322,795 | 3/1982 | Lange et al. | 711/136 |
| 4,334,305 | 6/1982 | Girardi | 370/359 |
| 4,394,731 | 7/1983 | Flusche et al. | 711/145 |
| 4,410,944 | 10/1983 | Kronies | 711/147 |

(List continued on next page.)

FOREIGN PATENT DOCUMENTS

| 0 211 613 | 2/1987 | European Pat. Off. . |
|---|---|---|
| 0 229 691 | 7/1987 | European Pat. Off. . |
| 0229932 | 7/1987 | European Pat. Off. . |
| 0273612 | 7/1987 | European Pat. Off. . |
| 0 278 315 | 8/1988 | European Pat. Off. . |
| 0 432 075 | 6/1991 | European Pat. Off. . |

OTHER PUBLICATIONS

*MSC–80/85 Family User's Manual* (Oct. 1979), Intel.
Titus, 8080/8085 Software Design.
Proc. of the 6th Annual Phoenix Conf. on Computer and Communications, Feb. 25–27, 1987, pp. 14–17.
"Multi–Microprocessors: an Overview . . . " IEEE vol. 26 #2, pp. 216–228.
"Cm*—A Modular Multi–Microprocessor," Nat'l Comp Confr '77, 637–644.

*Primary Examiner*—Glenn Gossage

[57] ABSTRACT

A digital data processing system and method with shared, distributed memory transfers data between corresponding data sets within memory. The digital data processing system includes a plurality of processing cells interconnected by a hierarchical network, at least some of the processing cells including a processor and a memory. Each memory provides storage space which is arranged in sets, with each set being capable of holding a plurality of data pages. At least one of the processing cells, as a first processing cell, includes a page distributor for determining when at least a first set in the associated memory has reached a predetermined storage commitment condition (for example, a filled condition). Under such a condition, the page distributor invokes a page-transfer element that selects a candidate processing cell from among the other processing cells and transfers one or more pages from the first set to a corresponding set in the candidate processing cell.

30 Claims, 10 Drawing Sheets

U.S. PATENT DOCUMENTS

| | | | |
|---|---|---|---|
| 4,410,946 | 10/1983 | Spencer | 711/137 |
| 4,432,057 | 2/1984 | Daniell et al. | 707/8 |
| 4,468,733 | 8/1984 | Oka et al. | 710/126 |
| 4,476,524 | 10/1984 | Brown et al. | 710/126 |
| 4,484,262 | 11/1984 | Sullivan et al. | 711/216 |
| 4,488,256 | 12/1984 | Zolnowsky et al. | 711/210 |
| 4,503,497 | 3/1985 | Krygowski et al. | 711/124 |
| 4,510,492 | 4/1985 | Mori et al. | 340/825.05 |
| 4,598,400 | 7/1986 | Hillis | 370/400 |
| 4,604,694 | 8/1986 | Hough | 710/200 |
| 4,622,631 | 11/1986 | Frank et al. | 707/201 |
| 4,625,081 | 11/1986 | Lotito et al. | 379/88.26 |
| 4,646,271 | 2/1987 | Uchiyama et al. | 365/49 |
| 4,700,347 | 10/1987 | Rettberg et al. | 714/700 |
| 4,701,756 | 10/1987 | Burr | 340/825.02 |
| 4,706,080 | 11/1987 | Sincoskie | 340/825.02 |
| 4,714,990 | 12/1987 | Desyllas et al. | 711/3 |
| 4,730,249 | 3/1988 | O'Quin et al. | 709/100 |
| 4,734,907 | 3/1988 | Turner | 370/390 |
| 4,754,394 | 6/1988 | Brantley, Jr. et al. | 711/5 |
| 4,768,144 | 8/1988 | Winter et al. | 707/1 |
| 4,780,873 | 10/1988 | Mattheyses | 370/360 |
| 4,797,880 | 1/1989 | Bussey, Jr. et al. | 370/411 |
| 4,811,009 | 3/1989 | Orino et al. | 340/825.05 |
| 4,814,970 | 3/1989 | Barbagelata et al. | 712/28 |
| 4,829,227 | 5/1989 | Turner | 370/422 |
| 4,845,702 | 7/1989 | Melindo | 359/135 |
| 4,885,742 | 12/1989 | Yano | 370/408 |
| 4,928,224 | 5/1990 | Zulian | 710/129 |
| 4,930,106 | 5/1990 | Danilenko et al. | 365/189.01 |
| 4,951,193 | 8/1990 | Muramatsu et al. | 711/206 |
| 4,984,235 | 1/1991 | Hillis et al. | 370/392 |
| 5,006,978 | 4/1991 | Neches | 709/102 |
| 5,025,365 | 6/1991 | Mathur et al. | 711/121 |
| 5,025,366 | 6/1991 | Baror | 711/128 |
| 5,055,999 | 10/1991 | Frank et al. | 711/163 |
| 5,067,071 | 11/1991 | Schanin et al. | 710/113 |
| 5,101,485 | 3/1992 | Perazzoli, Jr. | 711/206 |
| 5,119,481 | 6/1992 | Frank et al. | 710/100 |
| 5,136,717 | 8/1992 | Morley et al. | 712/16 |
| 5,212,773 | 5/1993 | Hillis | 709/243 |
| 5,226,039 | 7/1993 | Frank et al. | 370/405 |
| 5,226,109 | 7/1993 | Dawson et al. | 345/420 |
| 5,226,175 | 7/1993 | Deutsch et al. | 345/419 |
| 5,251,308 | 10/1993 | Frank et al. | 711/163 |
| 5,282,201 | 1/1994 | Frank et al. | 370/403 |
| 5,297,265 | 3/1994 | Frank et al. | 711/202 |

METHOD AND APPARATUS FOR DISTRIBUTING DATA IN A DIGITAL DATA PROCESSOR WITH DISTRIBUTED MEMORY

This is a Continuation of commonly assigned U.S. patent application Ser. No. 07/763,132 filed on Sep. 20, 1991 Entitled: IMPROVED DIGITAL DATA PROCESSOR WITH DISTRIBUTED MEMORY SYSTEM, now abandoned.

CROSS REFERENCE TO RELATED APPLICATIONS

This application is related to the following co-pending and commonly assigned applications, the teachings of which are incorporated herein by reference:

1) U.S. patent application Ser. No. 07/136,930, filed Dec. 22, 1987, for "MULTIPROCESSOR DIGITAL DATA PROCESSING SYSTEM," now U.S. Pat. No. 5,055,999 issued October 8, 1991;
2) U.S. patent application Ser. No. 07/696,291, filed May 20, 1991, now U.S. Pat. No. 5,119,481, which is a continuation of U.S. patent application Ser. No. 07/509,480, filed Apr. 13, 1990, now abandoned, which is a continuation of U.S. patent application Ser. No. 07/136,701, filed Dec. 22, 1987, now abandoned;
3) U.S. patent application Ser. No. 07/370,325, filed Jun. 22, 1989, for "MULTIPROCESSOR SYSTEM WITH MULTIPLE INSTRUCTION SOURCES," now abandoned in favor of U.S. patent application Ser. No. 08/066,334, now U.S. Pat. No. 5,822,578;
4) U.S. patent application Ser. No. 07/370,341, filed Jun. 22, 1989, for "IMPROVED MEMORY SYSTEM FOR A MULTIPROCESSOR," now U.S. Pat. No. 5,297,265, issued Mar. 22, 1994.
5) U.S. patent application Ser. No. 07/370,287, filed Jun. 22, 1989, for "IMPROVED MULTIPROCESSOR SYSTEM," now U.S. Pat. No. 5,251,308, issued Oct. 5, 1993;
6) U.S. patent application Ser. No. 07/499,182, filed Mar. 26, 1990, for "HIGH-SPEED PACKET SWITCHING APPARATUS AND METHOD," now U.S. Pat. No. 5,335,325, issued Aug. 2, 1994;
7) U.S. patent application Ser. No. 07/521,798, filed May 10, 1990, for "DYNAMIC PACKET ROUTING NETWORK," now U.S. Pat. No. 5,282,201, issued Jan. 25, 1994);
8) U.S. patent application Ser. No. 07/526,396, filed May 18, 1990, for "PACKET ROUTING SWITCH," now U.S. Pat. No. 5,226,039, issued Jul. 6, 1993;
9) U.S. patent application Ser. No. 07/531,506, filed May 31, 1990, for "DYNAMIC HIERARCHICAL ASSOCIATIVE MEMORY," now U.S. Pat. No. 5,341,483, issued Aug. 23, 1994.

BACKGROUND OF THE INVENTION

This invention relates to digital data processing and, more particularly, to moving and allocating data within a distributed memory system.

High-speed physical storage space on computer systems is limited. Programs that run on those systems often require access to more data than that which can fit into the high-speed stores, referred to as random access memory, or RAM. Sometimes the programs themselves—not just the data they process—consume more memory than is available on the system.

Early programs managed excess data by moving it directly between memory and disk as needed. This required little memory—just the space needed to store the data currently being processed—but slowed processing by requiring frequent disk accesses. Some gains were obtained by accessing data in blocks, reading large amounts of data from disk into arrays, processing those arrays, then writing them back out to disk.

With the advent of virtual memory management systems, data management functions have been taken over by the computer operating system software. Programs written for use with these systems reference large amounts of data as if stored entirely in memory. Often it is not: the virtual memory system itself moves data back and forth between physical memory and disk.

Data management and allocation becomes more complicated in computer systems which employ distributed memory, i.e., a plurality of distinct memory elements storing data from one or more processors. An example of such a system is disclosed by the aforementioned Frank et al, U.S. patent application Ser. No. 07/136,930, filed Dec. 22, 1987, now U.S. Pat. No. 5,055,999. There a digital data processing system is described as including a plurality of processing cells arranged in a hierarchy of rings. Each of the processing cells includes a central processing unit coupled with a memory element. Groups of cells are interconnected along unidirectional bus rings to form units referred to as segments. Communications between cells of different segments are carried out on higher level information transfer domains. These higher level domains are themselves made up of one or more segments, each comprising a plurality of routing elements coupled via a unidirectional bus ring.

A system of the type described by Frank et al does not require a main memory element, i.e., a memory element coupled to and shared by the systems many processors. Rather, data maintained by the system is distributed, both on exclusive and shared bases, among the memory elements associated with those processors. Modifications to a datum stored exclusively in any one processing cell do not have to be communicated along the bus structure to other storage areas. Accordingly, only that data which the processors dynamically share, e.g., sharing required by the executing program themselves, must be transmitted along the bus structure.

Although the Frank et al system provides mechanisms, such as the "recombine" operation for allocating data in the system, still further advances in this area are desirable.

Accordingly, an object of this invention is to provide an improved digital data processing system.

More particularly, an object is to provide a distributed memory digital data processing system with improved memory management.

Still another object of the invention is to provide a mechanism for managing data effectively and reducing paging in a distributed memory system.

SUMMARY OF THE INVENTION

These objects are attained by the invention which provides, in one aspect, a digital data processing system with shared, distributed memory which transfers data between corresponding data sets within memory.

More particularly, the invention provides in one aspect, a digital data processor having a plurality of processing cells interconnected, for example, by a hierarchical network. Each of the processing cells includes a central processing unit and an associated memory element. The storage space within each memory is arranged in sets, each capable of holding a plurality of data pages. For example, each set can hold pages having common high-order address bits.

At least a first processing cell includes a page distribution element for determining when at least a first set in the associated memory element has reached a predetermined storage commitment condition—e.g., that the set is filled. Under such a condition, the page distribution element invokes a page-transfer element that selects a candidate processing cell from among the other processing cells and transfers one or more pages from the first set to a corresponding set in the candidate processing cell.

In a related aspect of the invention, the page-transfer element generates and transmits on the network a signal representing a request for transfer of pages from the first set. Correspondingly, the candidate processing cell includes a take-ownership element for responding to the transfer request for generating a request for ownership access to the page.

Control units coupled to first and second processing cells respond to that ownership request for allocating, exclusively, within the corresponding set in the memory element of the candidate processing cell, memory physical storage space for the pages to be transferred; transferring those pages to that allocated space; and deallocating the physical storage space that previously stored the transferred pages in the first set (or making that space available for reallocation).

According to another aspect of the invention, the central processing unit of the first processing cell generates a local request for access to a page. The control unit responds to at least selected ones of those requests—e.g., requests which require allocation of a page in a set that is already full—for generating a line-full signal. A line-full element in the page distribution element responds to the line-full condition by invoking the page-transfer means.

In another aspect, a digital data processor of the type described above includes a table for storing a commitment status of the sets in the memory elements of the processing cells. Higher-level entries within that table correspond to sets in the memory elements, while lower-level ones reflect the status of a set in a specific memory element.

The page distribution element can respond to predetermined parameters for determining which pages in the first set to transfer. Those parameters can call, for example, for choosing for transfer certain modified pages for which no subpages are cached in a cache portion of the memory element.

Further, a wired page mechanism can be utilized to prevent selected pages within a set from being selected for transfer. This feature can be used, for example, to insure that storage space is reserved for critical operating system functions and data.

Moreover, the page distribution element can determine the processing cell to which to send the transfer request, as well as the pages to transfer, based on predetermined parameters. Candidate processing cells, for example, can be chosen based on locality to the processing cell that is attempting to transfer pages.

According to still another aspect of the invention, in the event the first processing cell is unable to transfer pages from an overly committed set within a selected period, it can transfer those pages directly to disk or other secondary storage device.

These and other objects are evident from the drawings and in the description below.

BRIEF DESCRIPTION OF THE DRAWINGS

A fuller understanding of the invention may be attained by reference to the drawings, in which.

DETAILED DESCRIPTION OF THE ILLUSTRATED EMBODIMENT

Figure 1:
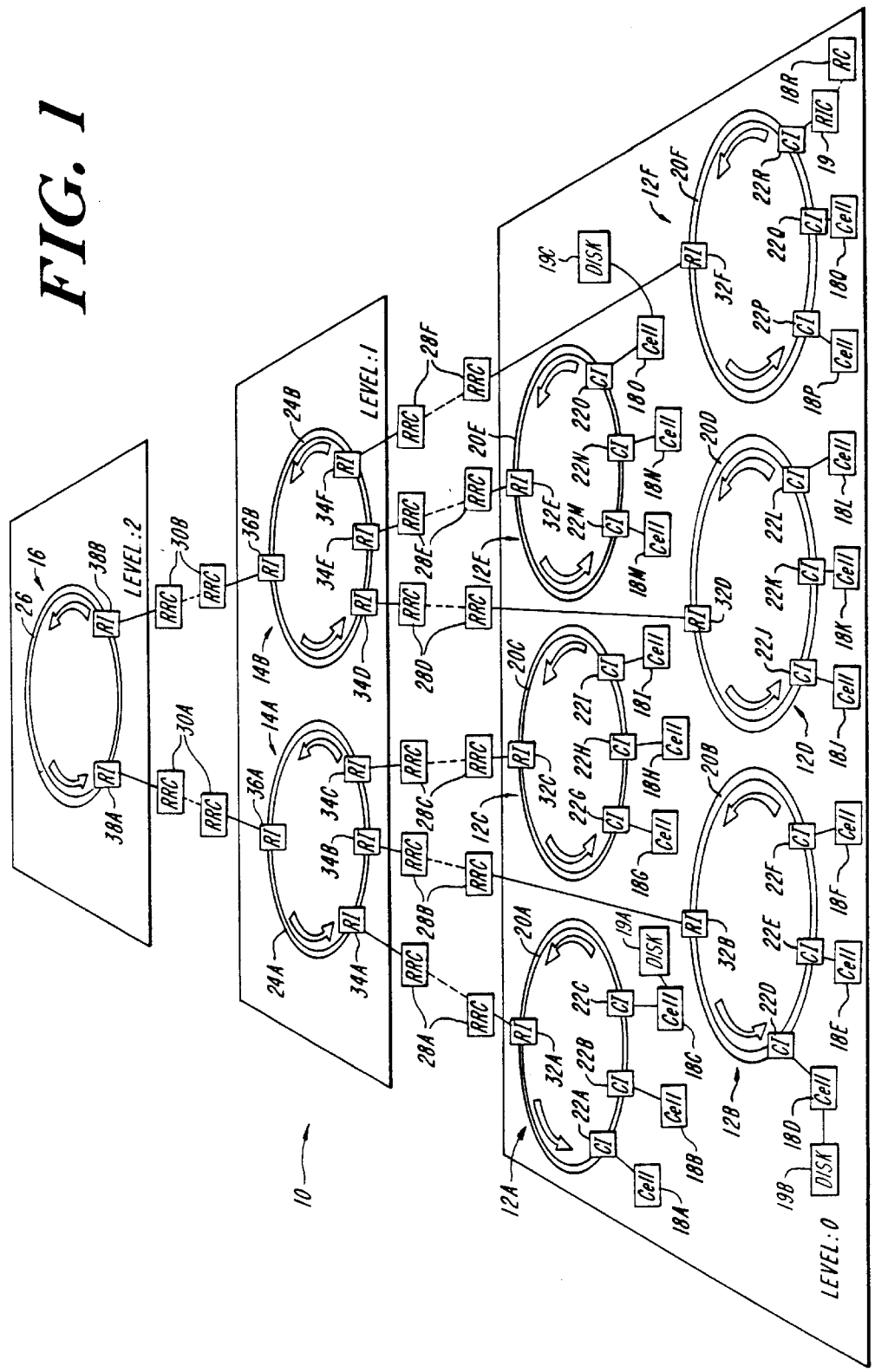
FIG. 1 depicts the structure of a multiprocessing system for use in a preferred practice of the invention.

FIG. 1 depicts a preferred multiprocessing system used to practice the invention. The illustrated system 10 includes three information transfer levels: level:0, level:1, and level:2. Each information transfer level includes one or more level segments, characterized by a bus element and a plurality of interface elements. Particularly, level:0 of the illustrated system 10 includes six segments, designated 12A, 12B, 12C, 12D, 12E and 12F, respectively. Similarly, level:1 includes segments 14A and 14B, while level:2 includes segment 16.

Each segment of level:0, i.e., segments 12A, 12B ... 12F, comprise a plurality of processing cells. For example, segment 12A includes processing cells 18A, 18B and 18C; segment 12B includes processing cells 18D, 18E and 18F; and so forth. Each of those processing cells include a central processing unit and a memory element, interconnected along an intraprocessing cellular processor bus (not shown). In accordance with the preferred practice of the invention, the memory element contained in each processing cells stores all control and data signals used by its associated central processing unit.

Certain processing cells of the processing system 10 are connected to secondary storage devices. In the illustrated system, for example, processing cell 18C is coupled with disk drive 19A, processing cell 18D is coupled with disk drive 19B, and processing cell 180 is coupled with disk drive 19C. The disk drives 19A–19C are of conventional design and can be selected from any of several commercially available devices. It will be appreciated that secondary storage devices other than disk drives, e.g., tape drives, can also be used to store information.

As further illustrated, each level:0 segment may be characterized as having a bus element providing a communication pathway for transferring information packets between the processing cells of the segment. Thus, illustrated segment 12A is characterized by bus 20A, segment 12B by 20B, segment 12C by 20C, et cetera. As described in greater detail below, digital information packets are passed between the processing cells 18A, 18B and 18C of exemplary segment 12A by way of the memory elements associated with each of those processing cells. Specific interfaces between those memory elements and the bus 20A are provided by processing cell interface units 22A, 22B and 22C, as shown. Similar direct communication pathways are established in segments 12B, 12C and 12D between their respective processing cells 18D, 18E . . . 18R by processing cell interface units 22D, 22E . . . 22R, as illustrated.

As shown in the illustration and noted above, the remaining information transfer levels, i.e., level:1 and level:2, each include one or more corresponding level segments. The number of segments in each successive segment being less than the number of segments in the prior one. Thus, level:1's two segments 14A and 14B number fewer than level:0's six 12A, 12B . . . 12F, while level:2, having only segment 16, includes the fewest of all. Each of the segments in level:1 and level:2, the "higher" levels, include a bus element for transferring packets within the respective segments. In the illustration, level:1 segments 14A and 14B include bus elements 24A and 24B, respectively, while level:2 segment 16 includes bus element 26.

Routing processing cells themselves provide a mechanism for transferring information between associated segments of successive levels. Routing processing cells 28A, 28B and 28C, for example, provide a means for transferring information to and from level:1 segment 14A and each of level:0 segments 12A, 12B and 12C, respectively. Similarly, routing processing cells 28D, 28E and 28F provide a means for transferring information to and from level:1 segment 14B and each of level:0 segments 12D, 12E and 12F, respectively. Further, routing processing cells 30A and 30B provide an information transfer pathway between level:2 segment 16 and level:1 segments 14A and 14B, as shown.

The routing processing cells interface their respective segments via interconnections at the bus elements. Thus, routing processing cell 28A interfaces bus elements 20A and 24A at ring interconnects 32A and 34A, respectively, while element 28B interfaces bus elements 20B and 24B at ring interconnects 32B and 34B, respectively, and so forth. Similarly, routing processing cells 30A and 30B interface their respective buses, i.e., 24A, 24B and 26, at ring interconnects 36A, 36B, 38A and 38B, as shown.

Data Movement & Coherency

Figure 2A:
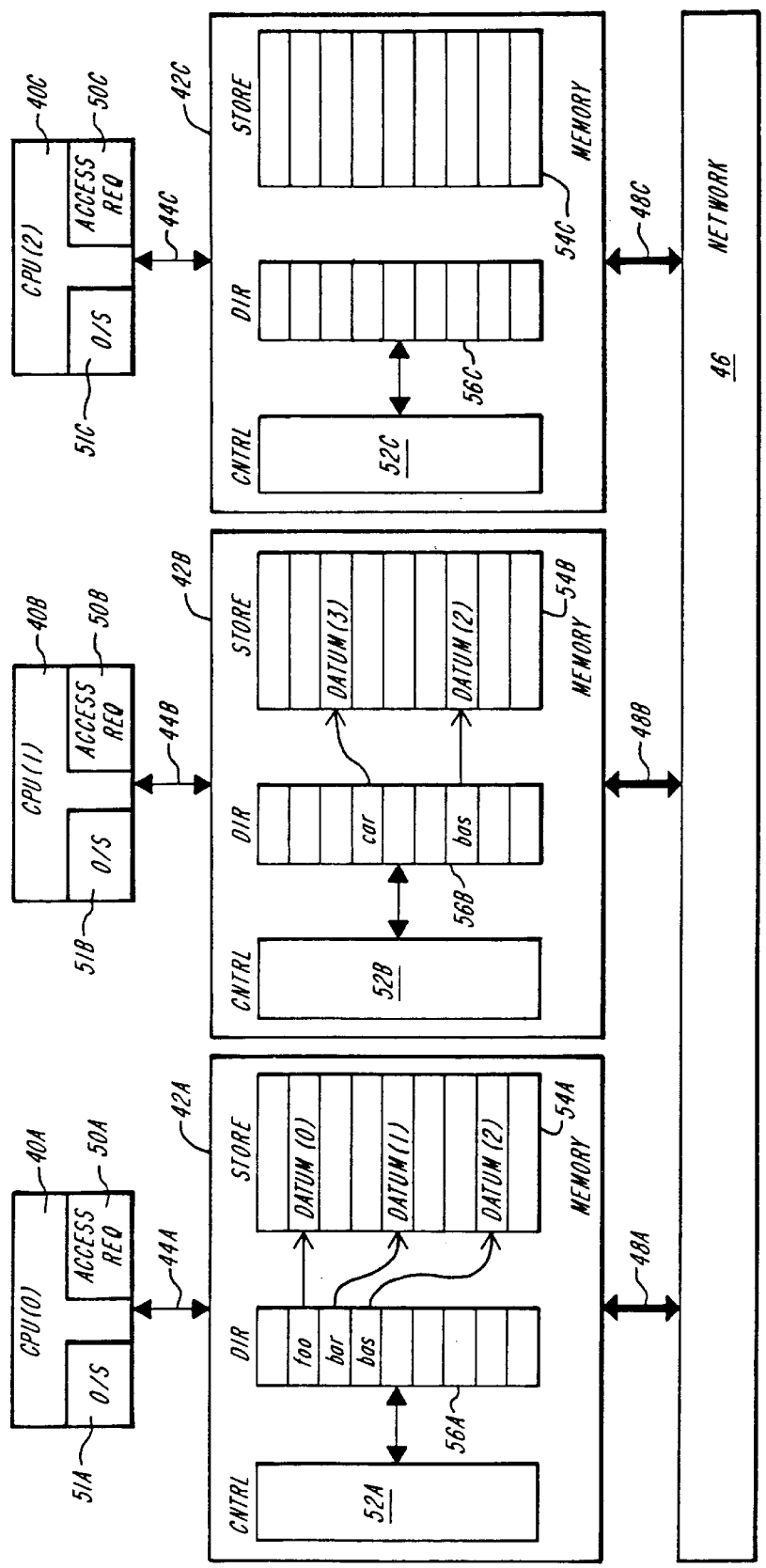
FIGS. 2A and 2B depict a preferred memory configuration and data management operation for the multiprocessor of FIG. 1.

FIG. 2A illustrates a mechanism for data movement within the processing system of FIG. 1 for insuring data coherence. In the drawing, plural central processing units 40(A), 40(B) and 40(C) are coupled, respectively, to associated memory elements 42(A), 42(B) and 42(C). Communications between the processing and memory units of each pair are carried along buses 44A, 44B and 44C, as shown. Network 46, representing the aforementioned level segments and routing processing cells, transfers information packets (passed to the network 46 over buses 48(A), 48(B) and 48(C) between the illustrated memory elements 42A–42C.

In the illustrated embodiment, the central processing units 40A, 40B and 40C each include an access request element, labelled 50A, 50B and 50C, respectively. These access request elements generate requests for access to data stored in the memory elements 42A, 42B and 42C. Among access requests signals generated by elements 50A, 50B and 50C is the ownership-request, representing a request for exclusive, modification access to a datum stored in the memory elements. In a preferred embodiment, access request elements 50A, 50B and 50C comprise a subset of an instruction set implemented on CPU's 40A, 40B and 40C. This instruction subset is described below.

The central processing units 40A, 40B, 40C operate under control of an operating system which includes operating system portions 51A, 51B and 51C which are resident on respective ones of the central processing units. The operating system provides an interface between applications programs executing on the central processing units and the system 10 facilities, and includes a virtual memory management system for managing data accesses and allocations.

A preferred operating system for controlling central processing units 40A, 40B and 40C is a UNIX-like operating system (i.e., a UNIX™ operating system or an an operating system based on, or constructed and operating similarly to the UNIX™ operating system) and, more preferably, the OSF/1 operating system available from Open Software Foundation, modified in accordance with the teachings herein.

The memory elements 40A, 40B and 40C include cache control units 52A, 52B and 52C, respectively. Each of these cache control units interfaces a data storage area 54A, 54B and 54C via a corresponding directory element 56A, 56B and 56C, as shown. Stores 54A, 54B and 54C are utilized by the illustrated system to provide physical storage space for data and instruction signals needed by their respective central processing units. Thus, store 54A maintains data and control information used by CPU 40A, while stores 54B and 54C maintain information used by central processing units 40B and 40C, respectively. The data maintained in each of the stores are identified by unique descriptors corresponding to system addresses. Those descriptors are stored in address storage locations of the corresponding directory. While the descriptors are considered unique, multiple copies of some descriptors may exist among the memory elements 42A, 42B and 42C where those copies themselves identify copies of the same data element.

Access requests generated by the central processing units 40A, 40B and 40C include, along with other control information, a descriptor or SVA ("system virtual address") request portion matching that of the requested datum. Each cache control unit 52A, 52B or 52C responds to access requests generated by its respective central processing units 40A, 40B or 40C by determining whether the requested datum is stored in the associated storage element 54A, 54B or 54C. If so, that item of information is transferred for use by the requesting central processor unit. If not, the cache control unit 52A, 52B, or 52C transmits a packet including the request to the network 46 along respective lines 48A, 48B or 48C.

As that packet travels within the networks and, particulary, along the level:0 segments, cache control units within the processing cells check their own directories, passing the requested data, if found, in a response packet. Likewise the local routing processing cell checks its directory. If that a routing processing cell's directory shows that the requested data is present in local segment, or ring, in the proper access state, it (that is, the routing processing cell) permits the request packet to continue along the local ring bus. If not, the routing processing cell extracts the packet and routes it to the associated level:1 segment.

The unresolved request packet travels along the level:1 segment in a similar fashion, i.e., it is compared with the directories of the associated level:1 routing processing cells.

If one of those directories fists the requested data in the proper access state in a descendant level:0 segment, the request is passed to that segment. Otherwise, the request packet may pass to a higher level, if any, in the hierarchy or be returned to the requester unresolved.

Packets containg requested data are routed back to requesting processing cells by differing mechanisms. A first mechanism relies on the address, or ID, of the requesting processing cell. Here, each requesting processing cell includes within its request packet an ID uniquely identifying that processing cell. Once that packet reaches the responding processing cell, that processing cell copies the requestor-ID, along with the datum and corresponding descriptor, into the response packet. As the response packet travels along the segment rings, the routing processing cells examine the requestor-ID to determine whether the requesting processing cell is in a descendant or parent segment and route the packet accordingly.

A second mechanism is used in conjunction with response packets that include data requested by processing cells but not specifically generated in response to those requests. By way of example, the mechanism applies in instances where two or more requesting processing cells generate requests for read-only copies to a specific datum held in a remote processing cell.

Presuming, in accordance with one preferred practice of the invention, that the network prevents at least some, but not all, of those requests from reaching a processing cell having a copy of that datum, the responding processing cell generates response packets bearing only the requestor-ID of a request packet that reached it.

Data coherency is maintained by cooperative action of the processing cells in response to data requests and transfers. More particularly, concurrent with generation of an ownership-access request packet by a first processing cell, the associated memory allocates in its store physical space to hold the requested data. Likewise, concurrent with the transfer of a requested datum from the processing cell in which it was previously stored, the associated memory deallocates physical storage space which had been previously allocated for storage of the requested datum.

Figure 2B:
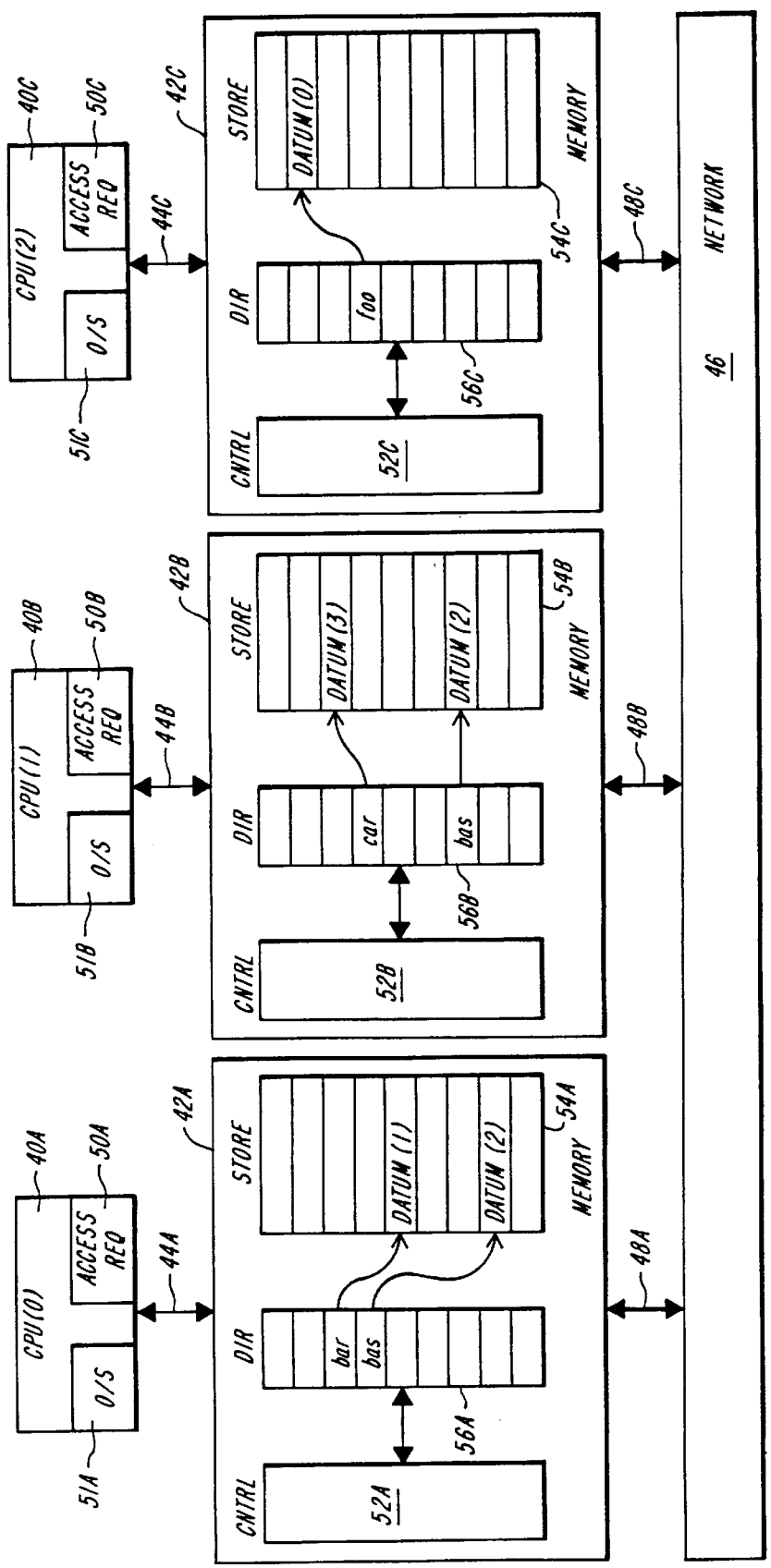

These cooperative actions are illustrated in FIGS. 2A and 2B. In the first of those drawings, DATUM(0), DATUM(1) and DATUM(2), representing data subpages, are retained in the store of the memory element 42A partnered with CPU 40A. Descriptors "foo," "bar" and "bas" which correspond, respectively, to those data, are stored in directory 56A. Each such descriptor includes a pointer indicating the location of its associated information signal in the store 54A.

The memory element 42B associated with CPU 40B stores DATUM(2) and DATUM(3), which also represent a data subpage. Corresponding to each of those data elements are descriptors "car" and "bas," retained in directory 56B. DATUM(2), and its descriptor "bas," are copied from store 54A and, therefore, retain the same labels.

The system illustrated in FIG. 2A does not store any data in the memory element 54C associated with CPU 40C.

FIG. 2B illustrates how a datum moves in conjunction with an ownership for it by processing cell which does not already have access to that datum. In particular, the illustration depicts the movement of DATUM(0) following issuance of an unresolved request for ownership for it by the processing cell made up of CPU 40C and memory 42C. At the outset, concurrent with the request, the cache control unit 52C allocates physical storage space in the store 54C of memory element 42C.

A response packet generated by memory 42A transfers the requested data, DATUM(0), from store 54A, where it had previously been stored, to the requestor's store 54C. Concurrently, the cache control unit 52A deallocates that space in store 54A which had previously held the requested datum. At the same time, the cache control unit 52A effects invalidation of the descriptor "foo" in directory 56A (where it had previously been used to identify DATUM(0) in store 54A), while cache control unit 52C establishes that same descriptor in directory 56C, where it will subsequently be used to identify the signal in store 54C.

In addition to descriptors, the memory elements 42A–42C assign access state information to the data and control signals in their respective stores. These access states, which include the invalid, read-only, ownership and atomic states, govern the manner in which data may be accessed by specific processors. A datum which is stored in a memory element whose associated central processing unit (CPU) maintains modification access over that datum is assigned an ownership state, while a datum which is stored in a memory element whose associated central processor unit (CPU) does not maintain priority access over that datum is assigned a read-only state. Further, a datum which has "bad" data is assigned the invalid state.

A further appreciation of preferred structures (e.g., cache control units) for data movement and memory coherence in a digital data processing system constructed in accordance with the invention may be had by reference to the above-cited related applications, e.g., U.S. patent application Ser. No. 07/136,930, filed Dec. 22, 1987, now U.S. Pat. No. 5,055,999, U.S. patent application Ser. No. 07/370,287, filed Jun. 22, 1989, now U.S. Pat. No. 5,251,308, U.S. patent application Ser. No. 07/521,798, filed May 10, 1990, now U.S. Pat. No. 5,282,201, and U.S. patent application Ser. No. 07/531,506, filed May 31, 1990, now U.S. Pat. No. 5,341,483.

Segment Bus

Figure 3:
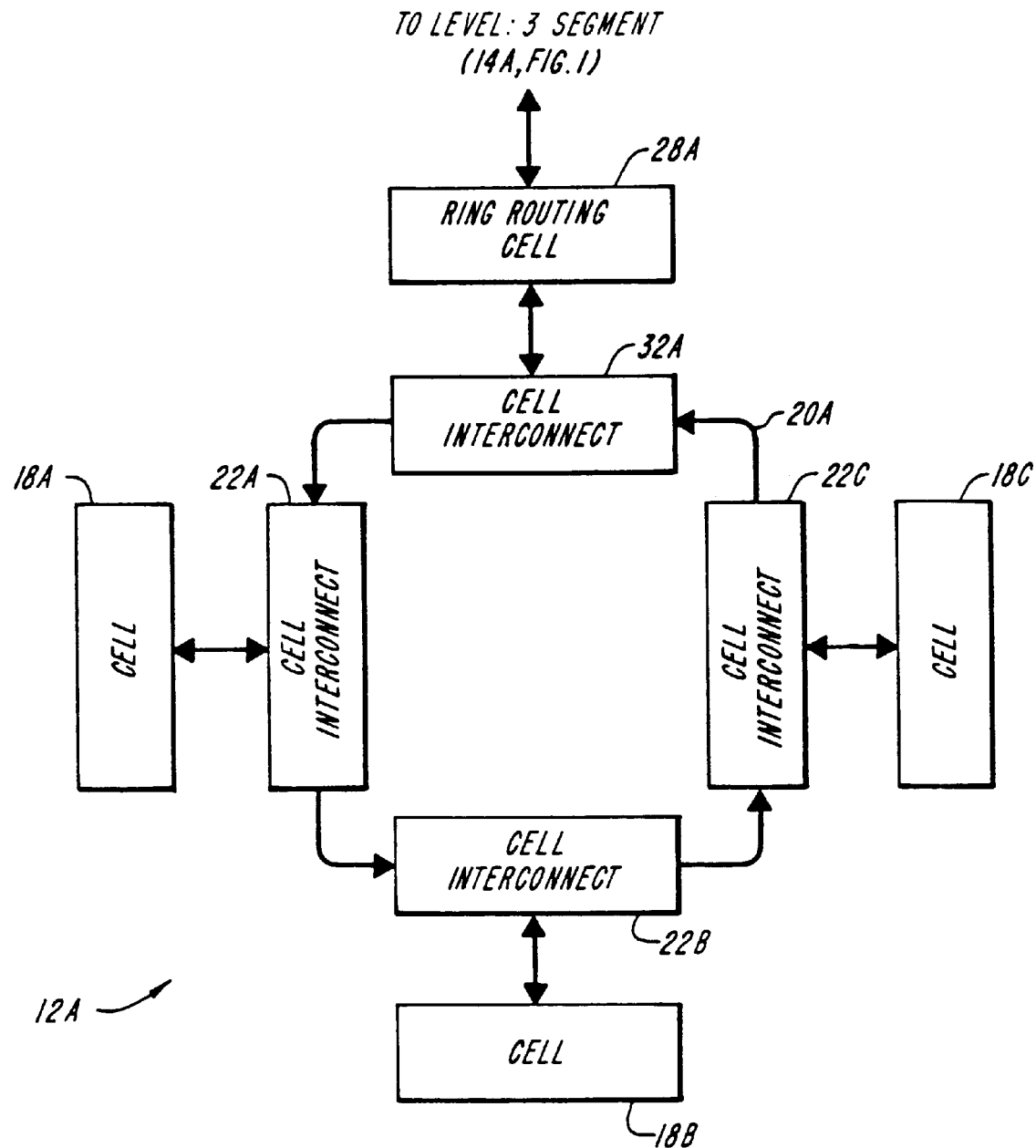
FIG. 3 depicts a preferred configuration for an exemplary level:0 segment of the multiprocessing system of FIG. 1.

FIG. 3 depicts a preferred configuration for exemplary level:0 segment 12A of FIG. 1. The segment 12A includes processing cells 18A, 18B and 18C interconnected by processing cell interconnects 22A, 22B and 22c along bus segment 20A. Routing unit 28A provides an interconnection between the level:0 segment 12A and if present, level:1 segment 14a of FIG. 1. This routing unit 28A is coupled along bus 20A by way of processing cell interconnect 32A, as shown. The structure of illustrated bus segment 20A, as well as its interrelationship with processing cell interconnects 22A, 22B, 22C and 32A, may be fully appreciated by reference to the above-cited related applications, e.g., U.S. patent application Ser. No. 07/696,291, now U.S. Pat. No. 5,119,481, issued Jun. 2, 1992.

Processing cell

Figure 4:
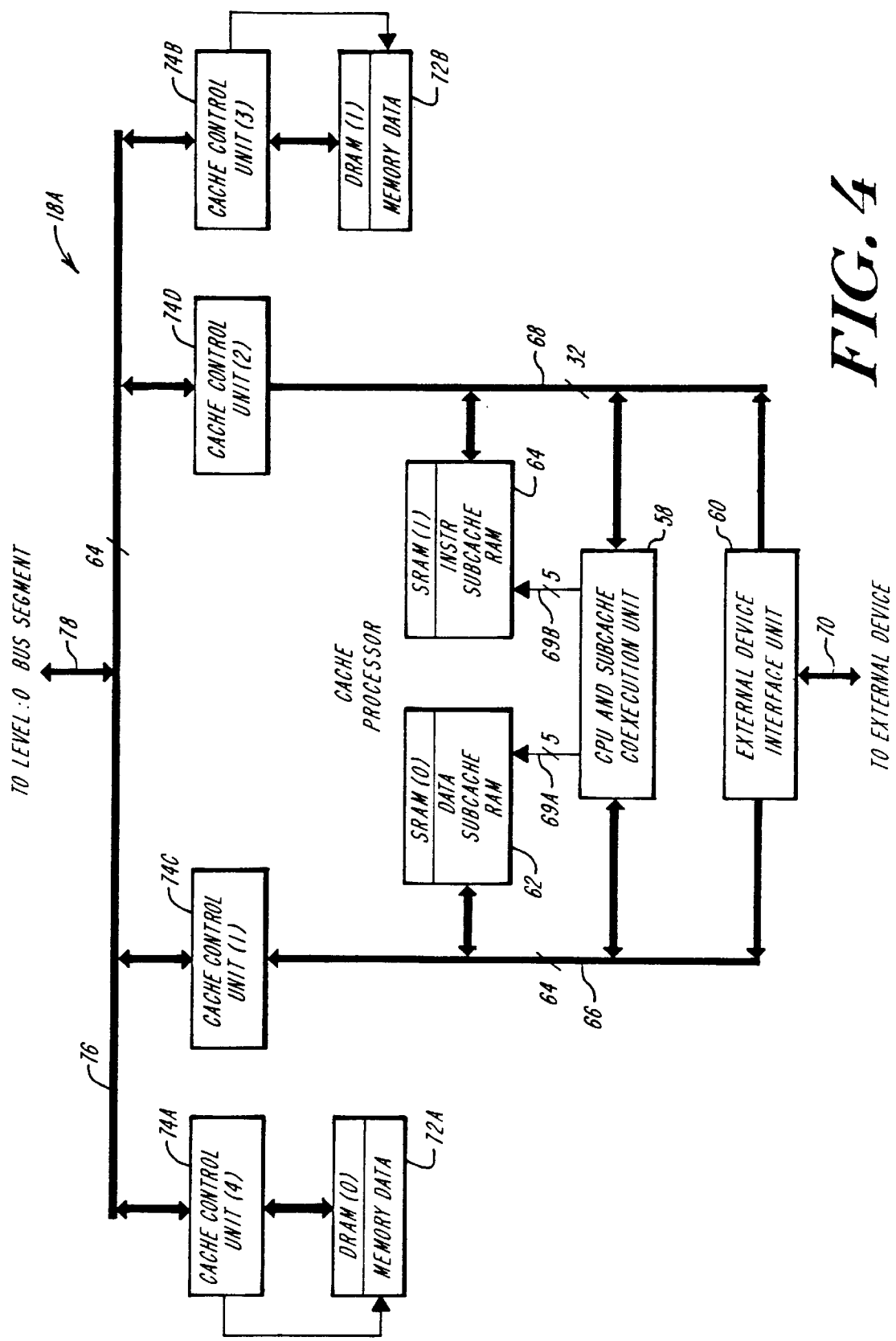
FIG. 4 depicts a preferred structure for processing cells of the multiprocessing system of FIG. 1.

FIG. 4 depicts a preferred structure for an exemplary processing cell 18A of the illustrated embodiment. The illustrated processing cell 18A includes a central processing unit 58 coupled with external device interface 60, data subcache 62 and instruction subcache 64 over processor bus 66 and instruction bus 68, respectively.

Interface 60 provides communications with an external device, e.g., disk drive 19A, over external device bus 70, in a manner conventional to the art.

A more complete understanding of the circuitry illustrated in this drawing may be attained by reference to the above-cited related patent applications, e.g., U.S. patent application Ser. No. 07/136,930, filed Dec. 22, 1987, now U.S. Pat. No. 5,055,999, issued Oct. 8, 1991, U.S. patent application Ser No. 07/370,325, filed Jun. 22, 1989, now abandoned in favor of U.S. patent application Ser. No. 08/461,166, filed Jun. 5, 1995, now U.S. Pat. No. 5,822,578 and U.S. patent application Ser. No. 07/499,182, filed Mar. 26, 1990, now U.S. Pat. No. 5,335,325 issued Aug. 2, 1994.

The Memory System

As discussed above, a multiprocessing system 10 constructed in accordance with a preferred embodiment of the invention permits access to individual data elements allocated to processing cells 18A, 18B, . . . 18R by reference to a unique descriptor, based on a system virtual address (SVA), associated with each datum. In the illustrated system 10, implementation of this capability is provided by the combined actions of the processing cell memory units in connection with their transfer of request and response packets over the network 46. In the discussion which follows, this is collectively referred to as the "memory system."

The illustrated system's processors, e.g., processors 40A, 40B, 40C, communicate with the memory system via two primary logical interfaces. The first is the data access interface, which is implemented by the load and store instructions. In a data access mode, the processor presents the memory system with an SVA and access mode information, and the memory system attempts to satisfy that access by finding the subpage containing the data and returning it.

The second logical interface mode is control access, which is implemented by memory system control instructions. In control access, the processor instructs the memory system to perform some side effect or return some information other than the actual data from a page. In addition to the primary interfaces, the operating system uses control locations in SVA space for configuration, maintenance, fault recovery, and diagnosis.

The memory system implements a hierarchy of storage. In the illustrated, preferred embodiment, each processing cell contains a central processing unit (CPU or CEU) which has a subcache that stores 0.5 MBytes of data. Those processing cells also include caches, which store 32 MBytes of data. Moreover, a preferred level:0 having, for example, 15 processing cells stores a total of 480 MBytes. While, a preferred level:1 having, for example, 32 level:0 's has a total of 15360 MBytes.

The memory system stores data in units of pages and subpages. For example, in the illustrated embodiment, each individual cache describes 32 Mbytes of SVA space, subdivided into 2048 pages. Pages contain $2^{14}$ (16384) bytes, divided into 128 subpages of $2^7$ (128) bytes. The memory system allocates storage in the caches on a page basis, and each page of SVA space is either entirely represented in the system or not represented at all. The memory system shares data between caches in units of subpages.

When a page of SVA space is resident in the system, the following are true:

(1) One or more caches allocates a page of storage to the page, each subpage of the page is stored in one or more of the caches with space allocated, but (2) Each cache with space allocated for a page may or may not contain a copy of all (or any) of the page's subpages.

A further appreciation of a preferred memory system for use in a digital data processing system constructed in accordance with the invention may be had by reference to the above-cited related applications, e.g., U.S. patent application Ser. No. 07/136,930, filed Dec. 22, 1987, now U.S. Pat. No. 5,055,999, U.S. patent application Ser. No. 07/370, 287, filed Jun. 22, 1989 now U.S. Pat. No. 5,251,308, U.S. patent application Ser. No. 07/521,798, filed May 10, 1990, now U.S. Pat. No. 5,282,201, and U.S. patent application Ser. No. 07/531,506, filed May 31, 1990, now U.S. Pat. No. 5,341,483.

Subpage States

The subpage states are defined in terms of three classes of subpage states: invalid, read-only, and owner. These three classes are ordered in strength according to the access that they permit. Invalid states permit no access. A read-only state permits load and instruction-fetch access. There are several owner states: all permit load access and permit the cache to respond to a data request from the network 46; some permit store access. Only one cache may hold a particular subpage in an owner state at any given time. The cache that holds a subpage in an owner state is called the owner of the subpage. Ownership of each subpage moves from cache to cache as processors request ownership via store instructions, special load instructions, and atomic state instructions (e.g., gsp or rsp) that request ownership.

Invalid States

When a subpage is not present in a cache, it is said to be in an invalid state with respect to that cache. If a processor requests a load or store to a subpage which is in an invalid state in its local cache, then that cache must request a copy of the subpage in some other cache in order to satisfy the data access. There are two invalid states: invalid-descriptor and invalid.

When a particular cache has no descriptor for a particular page, then all of the subpages of that page are said to be in an invalid-descriptor state in that cache. Thus, subpages in an invalid-descriptor state are not explicitly represented in the cache.

When the CEU references a subpage in invalid-descriptor state, the local cache must allocate one of the descriptors (in the correct set) to the SVA. After the descriptor allocation is complete, all subpages in the page have invalid state.

When the local cache has a descriptor for a particular page, but a particular subpage is not present in that cache, then that subpage is in invalid state. The local cache will attempt to obtain the subpage data by communicating with other caches.

Read-Only State

There is only one read-only state: read-only. Any number of caches may hold a particular subpage in the read-only state, provided that the owner of the subpage holds the subpage in a non-exclusive state. If the owner of the subpage has the subpage in any other state (i.e. an exclusive-ownership state, one of: exclusive, atomic, or transient-atomic), then no read-only copies can exist in any processing cell. The CEU cannot modify a subpage which is in the read-only state.

Owner States

There are two basic owner state types: non-exclusive and exclusive-ownership. When a particular cache holds a particular subpage in non-exclusive state, then some other caches may be holding that subpage in the read-only state. Programmatically, the non-exclusive state is the same as the read-only state. The CEU cannot modify a subpage which is in the non-exclusive state. The non-exclusive state is basically a book-keeping state used by the memory system; it defines the ownership of the subpage.

The exclusive-wnership states are exclusive, atomic, and transient-atomic. When a particular cache holds a particular subpage in the exclusive-ownership state, then no other cache may hold a read-only or non-exclusive copy of the subpage. If the local cache has a subpage in the exclusive-ownership state, the CEU can modify subpage data provided that the storage translation table (or "STT") grants write access to the segment and the descriptor.no_write flag is clear.

Atomic State

Atomic state is a stronger form of ownership than exclusive state. Subpages only enter and leave atomic state as a result of explicit requests by programs.

Fundamentally, atomic state can be used to coordinate and limit access to any subpage in SVA space. When a processor executes a gsp.nwt (get-subpage, no-wait) instruction to request that a subpage enter atomic state, the instruction will only complete normally if the subpage is not in atomic state already. Thus, atomic state on a subpage can be used as a simple lock. The lock is locked when the gsp.nwt instruction completes normally by first obtaining the subpage in exclusive state and then changing state from exclusive to atomic. The lock is unlocked by executing the rsp (release-subpage) instruction. The rsp instruction requires that the subpage exist in some cache with atomic or transient-atomic state. The local cache obtains the subpage and then changes the subpage from atomic or transient-atomic state to exclusive state. (If the subpage has transient-atomic state, the operation is more complex, but the effect is programmatically the same.)

It is important to note that atomic state is associated only with a subpage; there is no association with a particular operating system process (typically a user program) or to a particular processing cell. It is possible for a process to execute a gsp instruction to get a subpage in atomic state and subsequendy be switched by the operating system so that it continues execution on another processing cell. That process continues execution on the second processing cell and eventually executes an rsp instruction to release the subpage. Between those two instructions, there will only be a single copy of the subpage in the entire memory system, and it will be in atomic or transient-atomic state. As various processors execute instructions which reference the subpage, that single valid copy will move from processing cell to processing cell. It is also possible for a particular process to get atomic state, and another process to release atomic state.

Atomic state is simply an additional flag associated with a subpage; it is possible to implement protocols which use atomic state in addition to the data state of the subpage. Just as a protocol which is implemented using only data can have errors, it is possible for an atomic-state protocol to be defective. The hardware does not impose any checking on the use of atomic state beyond access control imposed by the STT and descriptor.noatomic.

Transient-Atomic State

The gsp.nwt instruction is always completed within its defined execution time, but it can succeed or fail (depending upon the current state of the subpage in the memory system). A second form of the instruction is gsp.wt (get-subpage, wait), which will not be completed until the subpage is obtained in exclusive state and changed to atomic state. The gsp.wt instruction relieves the programmer of the burden of determining whether or not the gsp instruction was successful. If the subpage is already in atomic or transient-atomic state when a processor executes gsp.wt, the processor will stall until the subpage is released, obtained by the local cache, and changed back from exclusive state to atomic or transient-atomic state. Use of the gsp.wt instruction can reduce the number of messages sent between caches as a processing cell waits for the opportunity to "lock the lock."

Transient-atomic state is used automatically by the memory system to allow gsp.wt to function efficiently. Its use is entirely transparent to the programmer. If a subpage is in atomic state and another cache executes gsp.wt on that subpage, that subpage enters transient-atomic state in the holding cache. When the subpage is later released with an rsp instruction, the transient-atomic state forces the subpage to be expelled onto the network in a special release state. The releasing cache changes its own state for the subpage to invalid. Any cache which is executing a gsp will see the subpage and accept it. The accepting cache will then be able to complete its gsp instruction and the subpage will enter transient-atomnic state in that cache. This operation will happen for each succeeding gsp and rsp until such time as an expelled subpage is not accepted by any other cache. At that time, the cache performing the release will change its subpage state back from invalid state (set when the subpage was released) back to exclusive state.

A further appreciation of preferred subpage states used in a digital data processing system constructed in accordance with the invention may be had by reference to the above-cited related applications, e.g., U.S. patent application Ser. No. 07/136,930, filed Dec. 22, 1987, now U.S. Pat. No. 5,055,999, U.S. patent application Ser. No. 07/370,287, filed Jun. 22, 1989, now U.S. Pat. No. 5,251,308, U.S. patent application Ser. No. 07/521,798, filed May 10, 1990, now U.S. Pat. No. 5,282,201, and U.S. patent application Ser. No. 07/531,506, filed May 31, 1990, now U.S. Pat. No. 5,341, 484.

Cache Directories

The associations between cache pages and SVA pages are recorded by each cache in its cache directory. Each cache directory is made up of descriptors. There is one descriptor for each page of memory in a cache. At a particular time, each descriptor is said to be valid or invalid. If a descriptor is valid, then the corresponding cache memory page is associated with a page of SVA space, and the descriptor records the associated SVA page address and state information. If a descriptor is invalid, then the corresponding cache memory page is logically not in use. There is no explicit validity flag associated with a descriptor; a descriptor may be considered invalid if the anchor and held fields are both clear, and there are no valid subpages present for the SVA page.

Each cache directory acts as a content-addressable memory. This permits a cache to locate a descriptor for a particular page of SVA space without an iterative search through all of its descriptors. Each cache directory is implemented as a 16-way set-associative memory with 128 sets. All of the pages of SVA space are divided into 128 equivalence classes, each associated with a cache directory set. A descriptor for a page can only be stored in the set of a cache directory that corresponds to the page's equivalence class. The equivalence class is selected by SVA[20: 14]. At any given time, a cache can describe no more than 16 pages with the same value for SVA[20:14], since there are 16 elements in each set.

Figure 5:
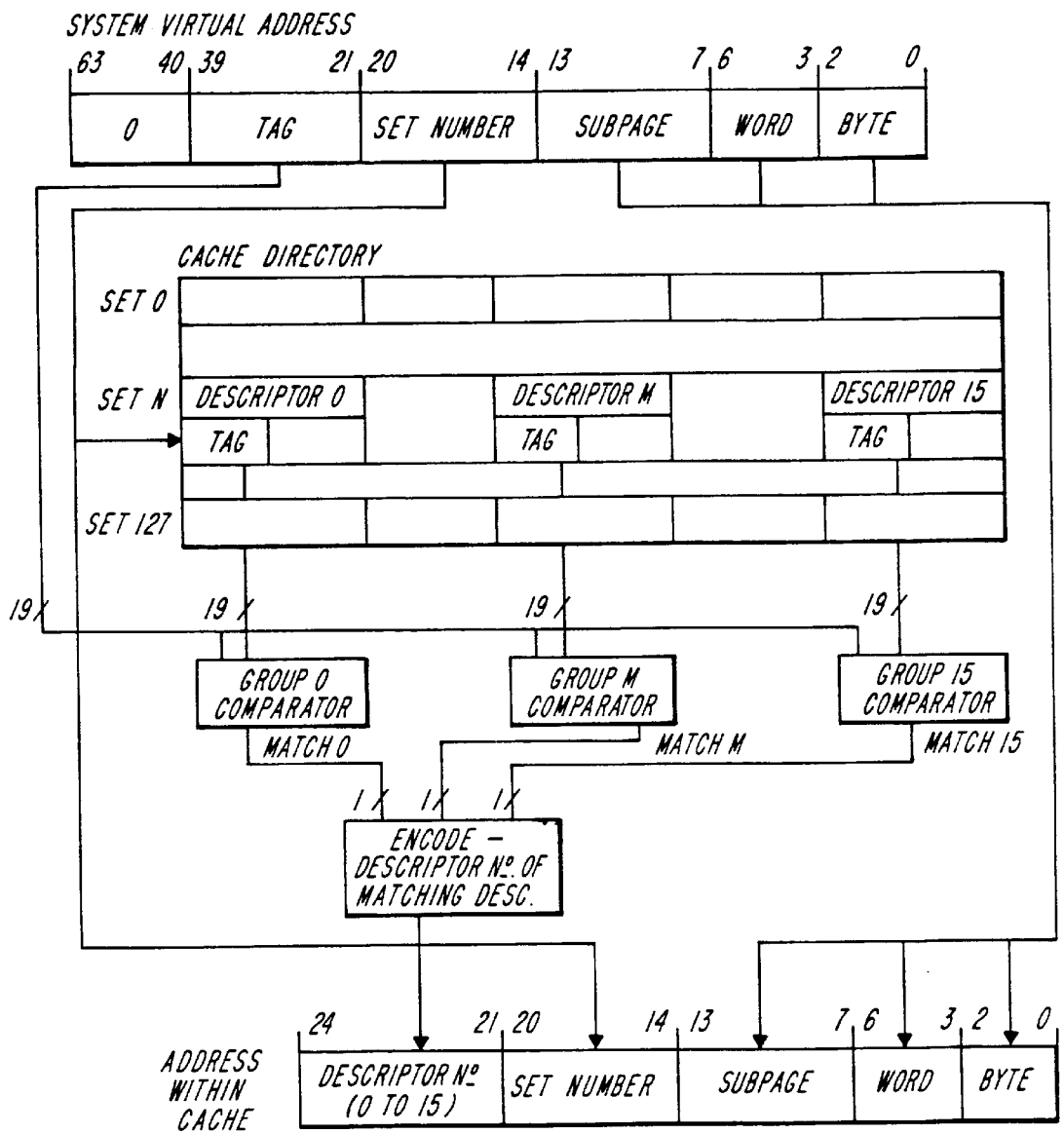
FIG. 5 depicts a preferred structure of a cache directory of the multiprocessing system of FIG. 1.

A preferred organization of a cache directory is shown in FIG. 5. When a reference to an SVA is made, the cache must determine whether or not it has the required information. This is accomplished by selecting a set within the cache, and then examining all the descriptors of that set. SVA[20:14] selects a set. In the general architecture, each of the descriptors in the selected set is simultaneously compared against SVA[63:21]. In a preferred embodiment having a 240 Mbyte SVA space, this implies a comparison with SVA[39:21]. If one of the elements of the set is a descriptor for the desired page, the corresponding comparator will indicate a match. The index in the set of the matching descriptor, concatenated with the set number, identifies a page in the cache.

If more than one descriptor matches, the cache signals a multiple descriptor_match exception. If no descriptor matches, the cache allocates a descriptor and requests data from the network. It is possible that either the allocation or data request will fail, and the cache will indicate an error to the CEU.

The use of SVA[20:14] to select a set is effectively a hash function over SVA addresses. The operating system must assign SVA addresses so that this hash function gives good performance in common cases. There are two important distribution cases: referencing many pages of a single segment and referencing the first page of many segments. This set selector produces good cache behavior for contiguous groups of pages, since 128 contiguous pages will reside in 128 distinct sets. However, this selector will produce poor hashing behavior for many pages with the same value in SVA[20:14]. The operating system can avoid the latter situation by varying the logical origin of data within segments. For example, each per-process user stack can be started at a different segment offset.

Contents of a Descriptor

When a processing cell responds to a request for a subpage, it supplies the subpage data and the values of certain descriptor fields in the local cache. When the response returns to the requestor it either copies those fields to descriptor fields (if it has no other valid subpages) or logically OR's those fields into descriptor fields. Some descriptor fields are never supplied by the responder nor updated by the requestor.

In a preferred embodiment, the descriptor fields are defined as follows:

descriptor.tag (19 bits)
Bits [39:21] of an SVA. This field identifies the particular page of SVA space specified by the corresponding descriptor. For a given set in a given processing cell, this field must be unique among all 16 descriptors.
The operating system 'sets' this field when it creates an SVA page. (It is also set by the operating system during cache initialization.)

descriptor.atomic_modified (1 bit)
A cache sets this bit flag to one when any subpage of this page undergoes a transition into or out of atomic state because a gsp or rsp instruction was successfully executed. It is also set when a subpage changes from atomic state to transient-atomic state.
This flag is not set if a gsp fails because the subpage is already in atomic state or if a rsp fails because the subpage was not in atomic state. This flag is not set if the gsp or rsp fails because descriptor.noatomic is set. The operating system sets this flag to zero to indicate that it has noted the atomic state changes. This field is propagated from cache to cache.

descriptor.modified (1 bit)
A cache sets this bit flag to one when any data is modified in the page. The operating system sets descriptor.modified to zero to indicate that it has noted the modification of the page. This flag is not set if an attempt to modify data fails because descriptor.no_write is set. This field is propagated from cache to cache.

descriptor.referenced (1 bit)
The cache sets this field on references to the page and clears the field periodically. This field is used to reflect that the page was recently referenced.

descriptor.anchor(1 bit)
Software sets this field to indicate that data requests from other caches may not be honored nor may the descriptor be dropped. Any read or get request from another cache returns unresponded to the requestor, and is treated as if the page were missing. This field is set by the operating system as part of creating or destroying an SVA page, and as part of modifying the page descriptor.

descriptor.held (1 bit)
Software sets this field to indicate that the descriptor may not be dropped by the cache even if no subpages are present in the cache.

descriptor.no_atomic (1 bit)
Software sets this field to prevent any cache from changing the atomic state of any subpage of this page. An attempt to execute a gsp or rsp fails, and is signalled back to the processor. The processor signals a page_no_atomic exception descriptor no atomic can be altered even when some subpages have atomic state. This flag simply prevents attempt to change atomic state, in the same way that descriptor.no_write simply prevents attempts to change data state. This field is propagated from cache to cache.

descriptor.no_write (1 bit)
Software sets this field to prevent modifications to the page by the local processor. An attempt to modify the page fails, and is signalled back to the processor. The processor signals a page_no write exception. This flag does not affect the ability of any cache to acquire the subpage in exclusive or atomic/transient-atomic state. This field is propagated from cacheto cache.

descriptor.summary (3 bits)
Summarizes subpage state field of a set of subpages. There is one three-bit summary field for each set of subpages. The summary sometimes overrides the contents of the individual subpage_state fields for the subpages within the summary set.

descriptor.subpage_state (4 bits)
The four-bit subpage state field comprises defined by two fields, including a three-bit state field and a single bit subcached status field. The subpage state field is set by the cache to record the state of each subpage and to indicate whether or not any portion of the subpage is present in the CEU subcache.

A further appreciation of preferred structures for the cache directory and descriptors in a digital data processing system constructed in accordance with the invention may be had by reference to the above-cited related applications, e.g., U.S. patent application Ser. No. 07/136,930, filed Dec. 22, 1987, now U.S. Pat. No. 5,055,999, U.S. patent application Ser. No. 07/370,287, filed Jun. 22, 1989, now U.S. Pat. No. 5,251,308, U.S. Pat. application Ser. No. 07/521,798, filed May 10, 1990, now U.S. Pat. No. 5,282,201, and U.S. patent application Ser. No. 07/531,506, filed May 31, 1990, now U.S. Pat. No. 5,341,483.

Subpage Atomic State Instructions

The subpage atomic instructions are the program interface to the get and release operations described above. These instructions exist in several forms to permit precise tuning of parallel programs.

get subpage [gsp.nwt]
get subpage & wait [gsp.wt]
Get subpage requests that a subpage be set into atomic state. For both forms of the get subpage instruction, if the subpage is not in atomic state in any cache, then the local cache acquires it in atomic state.

For gsp.nwt, a condition code "@MEM" indicates the success or failure of the attempt; the instruction will trap (that is, the processor processing the gsp.nwt will sequence to a trap routine) instead of changing @MEM if the trap option is present in the instruction and the subpage is already atomic.

The gsp.wt instruction form causes the cache to stall the CEU until the subpage can be obtained in atomic state. This reduces the amount of interconnect traffic if the program must obtain atomic state before it can proceed. If the subpage is already atomic in any cache (including the local cache), the instruction waits until the subpage is released. The local cache then acquires the subpage in atomic state. The @MEM condition is always changed to indicate success.

release subpage [rsp]

Release subpage is used to remove a subpage from atomic state. If the subpage is not present in the local cache, it is first requested in via the interconnect. Once the local cache has exclusive ownership, rsp proceeds. If the subpage is not in atomic state then release subpage does not change the subpage state. In this situation, the CEU will trap if a trap modifier is present for the instruction. If the subpage is in atomic state, it is changed to exclusive state. If the subpage is in transient-atomic state, it is changed to exclusive state and expelled onto the interconnect so that any waiting processing cell may acquire atomic state.

Page Manipulation

The system 10 operates in the manner described below to create and destroy pages and change descriptor fields. This discussion assumes that an anchored descriptor exists on the local cache.

Creating an SVA page

Following execution of an mpsa instruction (which, as described below, provides an anchored descriptor for an SVA page in the local cache of the processor executing the instruction), the descriptor exists, but all subpages are in invalid state. The operating system executes an mpdw instruction specifying that all subpage states should be set to exclusive. This causes a message to be sent on the network 46 so that any interested ring members may note the creation of the page.

The SVA page now exists, although its data values are undefined. Software must initialize the page using store instructions or 1/0 before allowing the user to reference the page. For this reason, the operating system will typically create a page at an SVA location inaccessible to user programs, initialize the page data, and then change the address of the SVA page as described below. The page is released for general use by executing an mpdw instruction which clears the anchor.

Destroying an SVA page

After the mpsa instruction, the operating system must obtain all subpages in exclusive state. This is done using mfsva instructions. The operating system then executes an mpdw instruction specifying that all subpages should be changed to invalid state. This instruction causes a message to be sent on the network 46 so that any interested ring members may note the destruction of the page. The SVA page is destroyed by this operation. Software releases the descriptor for reuse by executing a second mpdw instruction which clears the anchor.

Change Descriptor Fields

The mpdw instruction is used to change various fields in a local descriptor. It can set or clear the modified, atomic_ modified, no_write, noatomic, and held fields and can clear the anchor field. mpdw can also change the tag, and thus the SVA space address associated with the descriptor. (Since the index of the descriptor forms part of the SVA, the new tag is in the same cache set, by definition.)

To ensure memory system consistency, the operating system must obey certain rules when altering the fields or tag of a descriptor mpdw requires that descriptor.anchor be set (although the instruction itself may result in clearing descriptor.anchor). Various sequences require that all subpages be present in the local cache with an exclusive-ownership state. This is accomplished by setting descriptor.anchor and executing mfsva.ex for each subpage. Various sequences require that all subpages be cached in the local cache. This is accomplished by executing mflsp for each subpage which might be cached in the local CEU. (Executing an mfsva.ex instruction ensures that a subpage is not cached in by the CEU of any other processing cell.)

Memory System Control Instructions

Memory system control instructions permit the processor to directly manipulate the memory system. There are two classes of control instructions: data movement and page state control. The data movement control instructions move pages and subpages of data from cache to cache in the hierarchy. The page state control instructions manipulate page descriptors.

These CEU instructions result in cache commands which execute synchronously or asynchronously, depending upon the command. A CEU cache instruction may occupy an entry in a hardware table for the cache (identified herein as the "PRT") while it is in progress. The PRT has four entries, so a maximum of four cache instructions may execute in parallel. Most of these CEU instructions result in assignment of a PRT entry which remains in use until the request is satisfied, providing synchronous behavior. For example, load/store instructions execute synchronously, so that certain software-controlled exceptions (such as missing page or unwritable page) can be predictably resolved. The pcsp (prefetch-cache-subpage) and pstsp (post-store-subpage) instructions operate asynchronously, as described in following subsections.

Synchronous errors typically result in the CEU executing the trap sequence.

Asynchronous errors result from actual hardware errors or are provoked by a request from some other cache. Such errors are reported by memory-system interrupts.

Fetch Subpage Instruction

The mfsva instruction permits the operating system to fetch a subpage in read-only or exclusive-ownership state, specifying the SVA location of the subpage. This saves the operating system the effort of establishing a DSTT translation, as is required by pcsp.

Flush Subcached Subpage Instruction

The mflsp instruction causes the cache to ensure that the specified subpage is not subcached in the local CEU. If the subpage is in invalid-descriptor state or invalid state, no descriptor is allocated and the subpage is not requested via the network 46.

Recombine Subpage Instruction

The mrcsp instruction allows the operating system to reduce the number of active descriptors for a page by causing ownership to migrate to another cache. Unlike the background recombine activity of the cache, this instruction is not controlled by cache configuration parameters.

The page state control instructions operate on individual pages of SVA space.

Anchor Descriptor Instruction

The mpsa instruction provides an anchored descriptor in the local cache for an SVA page. If the descriptor already existed prior to the mpsa, its anchor flag is set. Otherwise, the cache allocates a descriptor and then sets the anchor flag. Page state control operations require that an anchored descriptor for the SVA page be present on the local cache.

Write Descriptor Instruction

The mpdw instruction is used to create and destroy SVA pages, and to change descriptor flags of existing SVA pages mpdw requires that the operating system first obtain an anchored descriptor for the page, using the mpsa instruction.

A further appreciation of memory system control instructions in a digital data processing system constructed in accordance with the invention maybe had by reference to the above-cited related applications, e.g., U.S. patent application Ser. No. 07/136,930, filed Dec. 22, 1987, now U.S. Pat. No. 5,055,999, U.S. patent application Ser. No. 07/370,287, filed Jun. 22, 1989, now U.S. Pat. No. 5,251,308, U.S. patent application Ser. No. 07/521,798, filed May 10, 1990, now U.S. Pat. No. 5,282,201, and U.S. patent application Ser. No. 07/531,506, filed May 31, 1990, now U.S. Pat. No. 5,341, 483.

Virtual Memory System

As noted above, the operating system includes a mechanism for managing data accesses and allocations. That mechanism, referred to herein as the "virtual memory" or "VM" system, performs three major functions. First, it manages the SVA space. This includes mapping of objects (files, devices, etc.) to SVA regions and the maintenance of atomic state information for those regions. Aspects of this first function are discussed in further detail in copending, commonly assigned U.S. patent application Ser. No. 07/763, 368, filed this day herewith, for DIGITAL DATA PROCESSOR WITH IMPROVED PAGING; abandoned in favor of U.S. patent application Ser. No. 08/461,174, filed Jun. 5, 1995, now abandoned.

Second, the virtal memory system manages each process's context address (CA) space. This includes the mapping of CA space to a region of SVA space using the segment translation table entries (STTE's). This also includes process management and debugger support. Aspects of this second function are discussed in further detail in copending, commonly assigned U.S. patent application Ser. No. 07/763,505, filed this day herewith, for DIGITAL DATA PROCESSOR WITH IMPROVED CHECKPOINTING & FORKING, now U.S. Pat. No: 5,313,647, issued May 17, 1994.

Third, the virtual memory system is responsible for resolving page faults and most of the trap conditions. Part of this task is reducing the frequency of the more severe types of faults, such as line fulls and faults that result in paging to or from devices. This is handled by attempting to make the most efficient use of the physical memory available in the system.

As part of the operating system, at least portions of the virtual memory system are resident on every processing cell, for example, for operation in conjunction with central processing units 40A, 40B,40C.

Cache Descriptor Usage & Replacement

The caches of the illustrated system 10 are used by the operating system as part of a multilevel storage system. In such a system, physical memory is multiplexed over a large address space via demand paging. The caches include features that accelerate the implementation of a multilevel storage system in which software moves data between the caches and secondary storage in units of SVA pages.

All of the caches together make up a system's primary storage. However, for some purposes, it is necessary to consider each individual cache as an independent primary store. This is because each cache can only hold a limited number of SVA pages: 2048 pages in each cache, and 16 in any particular set.

In operation, a CEU instruction may reference an SVA page which is not present in the local cache (it is in invalid-descriptor state). Before issuing a request on the network 46 for the requested subpage, the local cache must allocate a descriptor by (1) finding an invalid descriptor; (2) invalidating a read-only copy; or (3) destroying a pure SVA page (i.e., a for which: all subpages are in exclusive-ownership states; no subpages are subcached; no pending instructions, e.g., GET's, are in progress as reflected in a PRT table; and descriptor.modified, descriptor.atomicmodified, descriptor.held and descriptor.anchor are all clear).

Eventually, the process of allocating descriptors will fill up the elements of a particular cache set. In that instance, the corresponding cache control unit, e.g., 52A (FIG. 2A), cache will not be able to allocate a descriptor in the corresponding directory, e.g., 56A, and memory element, e.g., 54A. Accordingly, the cache control unit will signal a "line-full" exception, invoking a trap handler and, thereby, the operating system. Once invoked, the operating system can, for example, transfer a page currently in the cache line to disk, thereby opening a space in the cache (and cache line) for allocation.

It is desirable, however, to limit unnecessary paging. Accordingly, in a preferred system 10, the caches can allocate needed descriptors by (1) "dropping" pages for which copies exist elsewhere in the system; (2) recombining pages for which subpages are stored in other caches; and (3) distributing pages to less active or less filled cache lines in other caches.

Dropping Pages

Sometimes, there will be one or more descriptors in a cache set which have no valid subpages. This situation can arise as a result of requests generated by other caches, or as a result of recombining activity (described below). For example, assume that a cache descriptor has only one valid subpage, for which it has exclusive state. If some other cache requests ownership of the subpage, this cache no longer has any valid subpages of the page. If descriptor.held and descriptor.anchor are clear in this cache, then this descriptor can be reused when the CEU references some other page which has invalid-descriptor state in the same set of this cache.

A cache will automatically drop—i.e., invalidate the descriptor for—a page which has all subpages in read-only or invalid state (a read-only page), provided that no subpage is subcached. This is possible because no information is lost by the memory system when it destroys read-only copies. The cache has configuration options to totally disable copy dropping or to restrict it to a partial range of descriptors, according to the referenced bit.

A cache will automatically drop a page which has all subpages in some exclusive-ownership state and which has descriptor.modified and descriptor.atomic modified both clear. The fact that the cache has exclusive ownership of all subpages guarantees that no other cache has ownership or a copy of some portion of the data state, and allows this cache to destroy data state without communicating with any other cache. The fact that descriptor.modified and descriptor.atomic modified are both clear indicates that no data or atomic state change (including transition from atomic state to transient-atomic state as the result of a gsp.wt instruction) has occurred since the SVA page was created or last polled by operating system. The memory system presumes that operating system has a copy of the page data and atomic state on secondary storage which can be used to recreate the SVA page, and destroys the page. The cache has configuration options to totally disable pure page dropping or to restrict it to a partial range of descriptors, according to the referenced bit. Note that operating system must never asynchronously clear descriptor.atomicmodified if any subpage is in transient-atomic state.

Note that setting descriptor.held does not guarantee that the individual subpages will be present in the local cache. Further, simply setting descriptor.held for a page does not prevent some other cache from destroying the page operating system must take explicit action to prevent hardware from automatically dropping a pure page (e.g. set descriptor.modified).

A further appreciation of page dropping in a digital data processing system constructed in accordance with the invention may be had by reference to the above-cited related applications, e.g., U.S. patent application Ser. No. 07/136, 930, filed Dec. 22, 1987, now U.S. Pat. No. 5,055,999, U.S. patent application Ser. No. 07/370,287, filed Jun. 22, 1989, now U.S. Pat. No. 5,251,308, U.S. patent application Ser. No. 07/521,798, filed May 10, 1990, now U.S. Pat. No. 5,282,201, and U.S. patent application Ser. No. 07/531,506, filed May 31, 1990, now U.S. Pat. No. 5,341,483.

Recombining Pages

In the recombining operation, an owned subpage is expelled from a cache onto the network 46 and other caches are given an opportunity to accept ownership state. Any accepting cache must already have a descriptor allocated for the containing page; a cache will not allocate a descriptor in order to accept the ownership of a subpage being recombined. The goal of page recombining is to reduce the total number of descriptors which are allocated for a particular SVA page.

A cache issues a recombine message to recombine a subpage. If the recombine messages fail to find another cache to take over the page, the recombining cache retains the data. In effect, it has found itself as the target of the recombine. If some other cache accepts ownership (which may be non-exclusive, exclusive, atomic or transient-atomic state), the issuing cache changes its subpage state to invalid.

The caches will automatically attempt to recombine subpages as a background activity while memory refresh is occurring. At each refresh interval, the cache examines a particular set, and searches for an acceptable descriptor. The descriptor must have no subcached subpages, must own some subpage, and must not have all subpages in exclusive-ownership state. If such a page is found, the cache issues a recombine message for some owned subpage. The cache has configuration options to totally disable background recombining or to restrict it to a partial range of descriptors, according to the referenced bit. Background recombining makes it more likely that the cache will be able to allocate a descriptor for a newly referenced SVA page, instead of causing a line-full error.

Since pages for which the referenced bit is not set are less likely to be actively in use, most of the recombines that actually move data will move it from a processing cell which is not referencing the data to a processing cell which is.

If the cache holds relatively few subpages in ownership states, then software can attempt to recombine those subpages to other caches using the mrcsp (recombine-subpage) instruction. Otherwise, it might decide to obtain the entire SVA page and purify or destroy it.

As the working set changes, operating system can modify the configuration parameters which control the cache. The parameters for pure-dropping, copy-dropping, and background recombines can be altered to ensure that hardware actions are consistent with software working-set policy.

A further appreciation of recombining in a digital data processing system constructed in accordance with the invention may be had by reference to the above-cited related applications, e.g., U.S. patent application Ser. No. 07/136, 930, filed Dec. 22, 1987, now U.S. Pat. No. 5,055,999, U.S. patent application Ser. No. 07/370,287, filed Jun. 22, 1989, now U.S. Pat. No. 5,251,308, U.S. patent application Ser. No. 07/521,798, filed May 10, 1990, now U.S. Pat. No. 5,282,201, and U.S. patent application Ser. No. 07/531,506, filed May 31, 1990, now U.S. Pat. No. 5,341,483.

Cache Line Distribution

Figure 6:
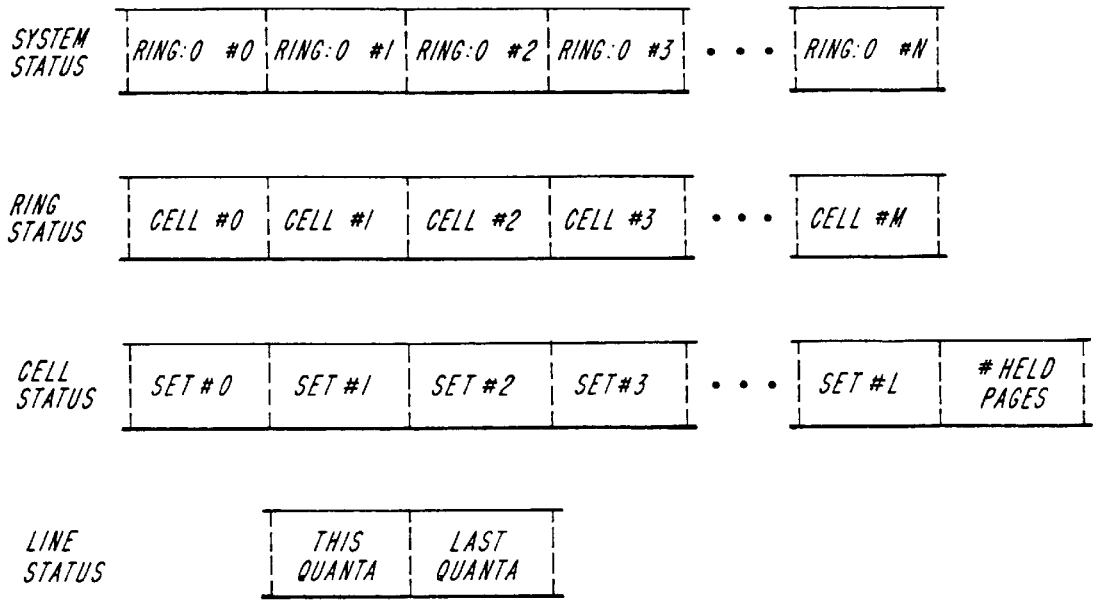
FIG. 6 depicts a preferred data structure for monitoring the status of each cache line (or memory set) on each processing cell in the multiprocessing system of FIG. 1.

FIG. 6 illustrates a preferred data structure for monitoring the status of each line on each processing cell in the system 10 and, particularly, the number of occurrences of the line-full condition during designated time intervals referred to as "quantum" on each such processing cell line.

The illustrated data structure includes a SYSTEM STATUS array having entries labelled "RING:0 #0," "RING:0 #1," "RING:0 #2," and so forth, each for a respective ring:0, or segment, in level:0 of the system 10.

The entries of the SYSTEM STATUS array each hold (or point to) a RING STATUS array of the type illustrated. That array has entries labelled "Cell #0," "Cell #1," "Cell #2," and so forth, each for a respective one of the processing cells in the corresponding ring:0.

Likewise, the entries of the RING STATUS array each hold (or point to) a CELL STATUS array of the type illustrated. That array has entries labelled "SET #0," "SET #1," "SET #2," and so forth, each for a respective one of the cache lines in the corresponding processing cell.

Still further, the entries of the CELL STATUS array each hold (or point to) a LINE STATUS array having three entries, labelled "THIS QUANTUM" and "LAST QUANTUM," reflecting the number of line-fills in the corresponding processing cell line during in current and prior time intervals, respectively, as well as the number of wire pages in the line.

The virtal memory system initializes the LINE STATUS array to zero. Values in the entry THIS QUANTUM are incremented by the trap handler each time a line-full exception is issued. Values in the entry THIS QUANTUM are periodically transferred to the associated entry LAST QUANTUM by the procedure VM_CLEAN_LINE, discussed below; concurrently, the value in THIS QUANTUM is zeroed.

VM_FAULT_LINE_FULL

Upon signalling of a line-full exception by the cache control unit, e.g., 52A, and invoking of the trap handler, the virtual memory system executes the VM_FAULT_LINE_ FULL procedure on the corresponding central processing unit. When invoked, VM_FAULT_LINE_FULL operates synchronously to "clear" at least one page from the faulting cache line and restart the faulting process (e.g., an application program). In clearing a page, the procedure VM_FAULT_LINE_FULL invokes VM_PAGE_ CLEAN and VM_PAGE_TRANSFER, as described below. VM_FAULT_LINE_FULL accepts as input the designation of a line on a processing cell that caused the line-full fault.

Figure 7:
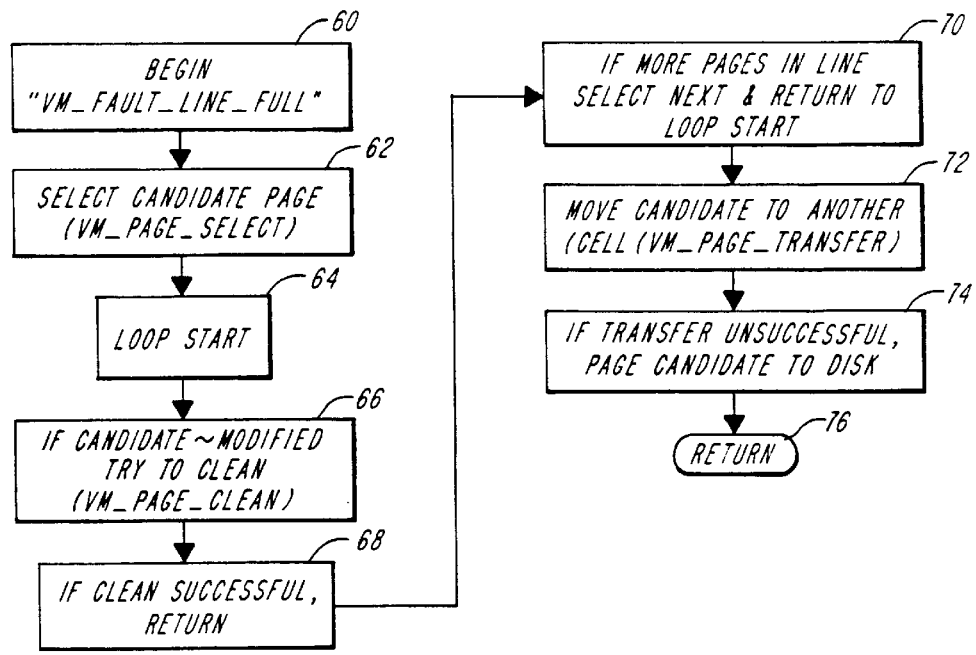
FIG. 7 depicts a preferred sequence of steps taken by a processing cell to handle a cache line-full exception within the multiprocessing system of FIG. 1.

A preferred sequence of steps for VM_FAULT_LINE_ FULL is depicted in FIG. 7, beginning at step 60.

| Step | Operation |
|---|---|
| 60 | Begin. |
| 62 | Identify candidate page using procedure VM_PAGE_SELECT and to read that page's descriptor. |
| 66 | If the candidage's modified bit is not set do:<br>A) Call VM_PAGE_CLEAN. |
| 68 | B) If it is successful, return. |
| 70 | If there are more pages in the line, do:<br>A) Select the next page, again, using VM_PAGE_SELECT.<br>B) Go to step 64. |
| 72 | Call VM_PAGE_TRANSFER to see if the candidate page can be moved to another processing cell. |
| 74 | If no candidate processing cell was found write the page out to its device. |
| 76 | Return. |

VM_PAGE_CLEAN

The virtual memory system executes the VM_PAGE_CLEAN procedure on demand, e.g., when handling line-fulls VM_FAULT_LINE_FULL, and on a periodic basis, e.g., as part of background clean-up. Thus the procedure can be invoked as part of a synchronous or asynchronous process.

When invoked, VM_PAGE_CLEAN attempts to keep at least a minimum number of pages clean on each line by dropping, recombining or transferring pages. The procedure accepts as input the address of a page to clean and produces as output a status signal.

Figure 8:
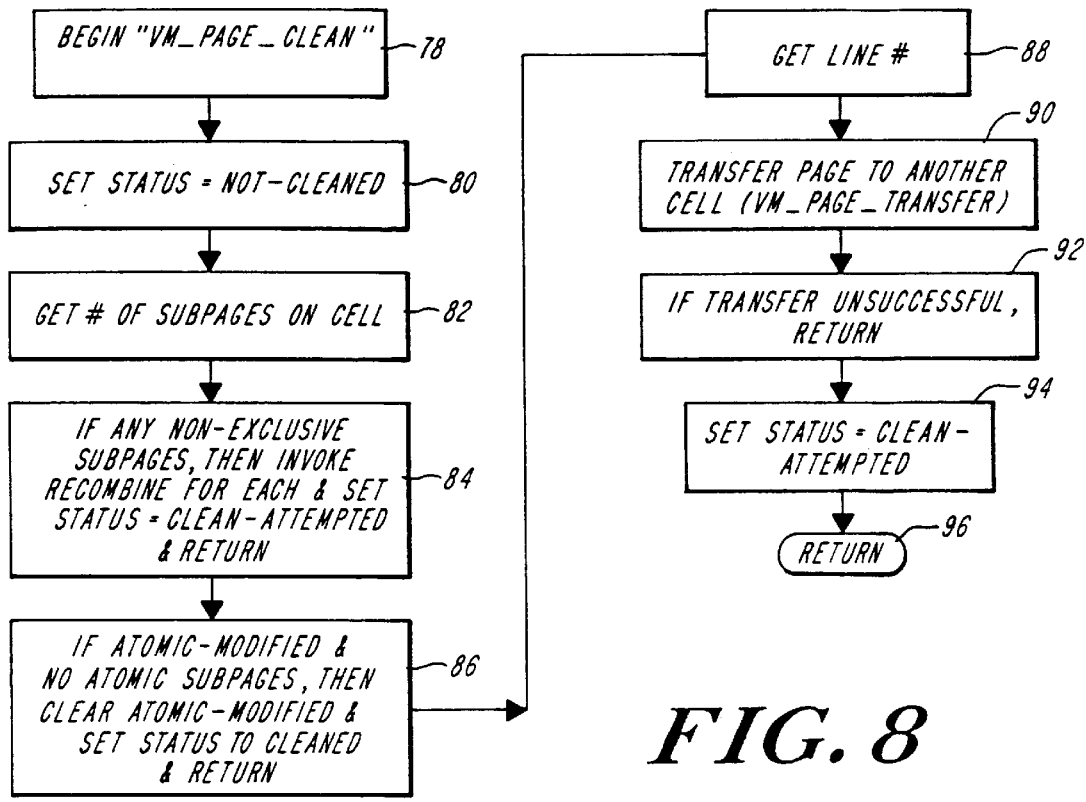
FIGS. 8–11 depict a preferred sequence of steps taken by a processing cell to transfer pages from a cache line in one processing cell to another processing cell within the multiprocessing system of FIG. 1.

A preferred sequence of steps for VM_PAGE_CLEAN is depicted in FIG. 8, beginning with step 78.

| Step | Operation |
|---|---|
| 78 | Begin. |
| 80 | Set return status to VM_PAGE_NOT_CLEANED. |
| 82 | Determine the number of subpages of the input page on the processing cell. |
| 84 | If at least one subpage is non-exclusive do:<br>A) For each subpage owned by this processing cell issue the recombine instruction.<br>B) Set status to VM_PAGE_CLEAN_ATTEMPTED.<br>C) Return |
| 86 | Otherwise, if the atomic-modified bit is set do:<br>A) Get the atomic state for the subpages.<br>B) If none of the subpages are atomic do:<br>  i) Clear the atomic-modified bit.<br>  ii) Set status to VM_PAGE_CLEANED.<br>  iii) Return. |
| 88 | Determine which line contains the page. |
| 90 | Call VM_PAGE_TRANSFER to attempt to move the page to another processing cell. |
| 92 | If unsuccessful, return. |
| 94 | Set status to VM_PAGE_CLEAN_ATTEMPTED. |
| 96 | Return. |

VM PAGE TRANSFER

The virtual memory system executes the VM_PAGE_TRANSFER procedure to determine whether a first processing cell can take ownership of a page from a second processing cell. If so, it signals the first processing cell to take ownership. VM_PAGE_TRANSFER is invoked, for example, by VM_PAGE_CLEAN. The VM_PAGE_TRANSFER procedure accepts as input the address of a page to transfer, and produces as output a status signal.

VM_PAGE_TRANSFER searches the data structure of FIG. 6 to determine which cache has sufficient room in its corresponding cache line to accept a transferred page. Site-specific parameters can be utilized to determine the sequence in which candidate caches are chosen. For example, in one preferred embodiment, candidate transferee caches are chosen from among specific processing cells in the same ring:0 as the transferor cache. If the corresponding lines of all of those local caches are fill, VM_PAGE_TRANSFER can choose among processing cells of other ring:0's.

Figure 9:
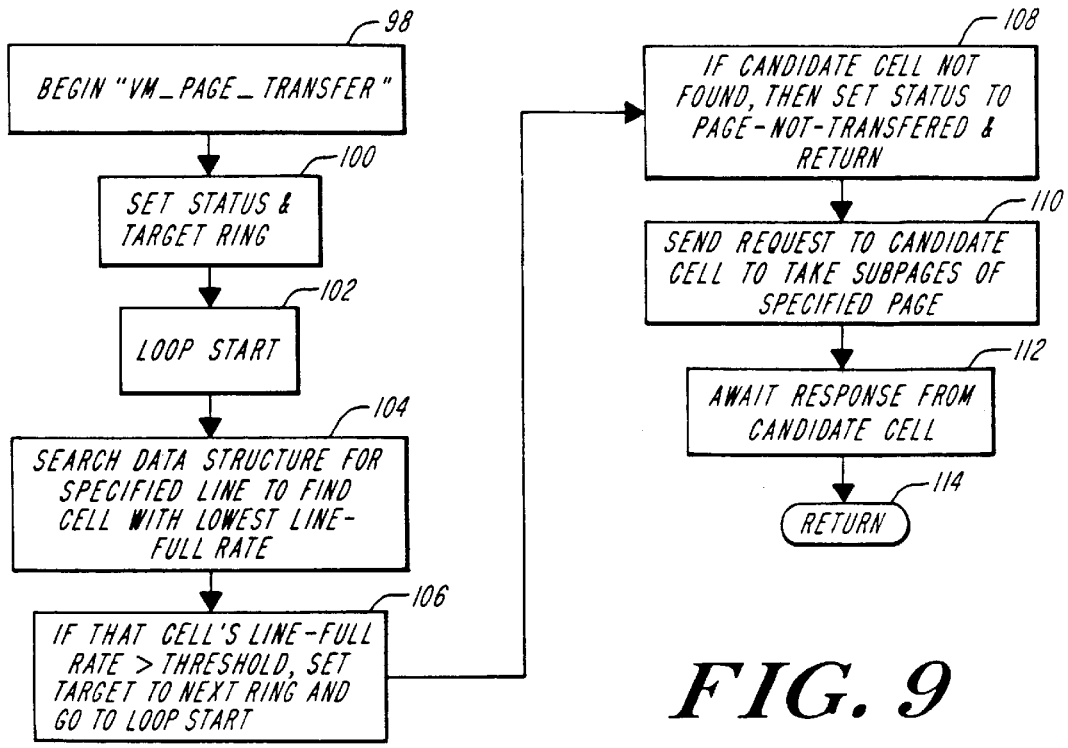

A preferred sequence of steps for VM_PAGE_TRANSFER is depicted in FIG. 9, beginning at step 98.

| Step | Operation |
|---|---|
| 98 | Begin. |
| 100 | Set status to VM_NORMAL.<br>Set target_ring:0 to the ring:0 listed in this process. |
| 102 | Loop start. |
| 104 | Search each entry in vm_line_status ring[target_ring:0] (see Figure 6) to find the processing cell with the lowest line_full rate. |
| 106 | If its line_full rate is greater than VM_LINE_FULL_RATE_TARGET then do:<br>A) Set target_ring:0 to the next ring:0.<br>B) If the new target_ring:0 has not yet been examined, go back to step 102. |
| 108 | If a candidate processing cell was not found, then set status to VM_PAGE_NOT_TRANSFERRED and return. |
| 110 | If a candidate processing cell was found do:<br>A) Read the page's summary bits.<br>B) Call enqueue_processing cell_msg (waiting on the page) to send a request to the other processing cell to take the subpages that are currently owned by this processing cell. |
| 112 | C) When awakened, return. |

VM_PAGE_TAKE_OWNERSHIP

The virtual memory system executes the VM_PAGE_TAKE_OWNERSHIP procedure to take ownership of a page from another processing cell. This procedure is invoked by the interprocessing cell message handler which, in turn, carries a message signalled by another processing cell executing VM_PAGE_TRANSFER. VM_PAGE_TAKE_OWNERSHIP accepts as input the address of a page to be transferred.

Figure 10:
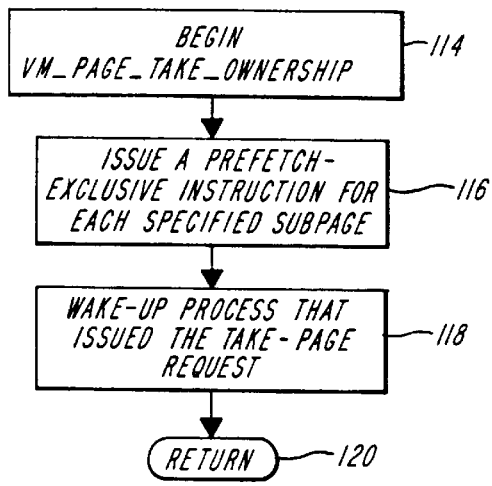

A preferred sequence of steps for VM—PAGE—TAKE—OWNERSHIP is depicted in FIG. 10, beginning at step 114.

| Step | Operation |
|---|---|
| 116 | Issue the prefetch-exclusive instruction for each subpage in the page. |
| 118 | Call wakeup, with the page address as channel to wake up the process that made the take-page request. |
| 120 | Return. |

VM_CLEAN_LINE

The virtual memory system on each processing cell executes the procedure VM—CLEAN—LINE periodically to keep the number of clean pages in that processing cell above a threshold value, VM—LINE—FULL_TOT_HIGH. The procedure is preferably invoked by the software clock as part of callout queue management.

Briefly, on each processing cell the virtual memory system (executing a "daemon") loops through the processing cell's cache trying to purify pages on lines that have had a large number of line-fulls. This purification is done in one of four ways: (1) by issuing a recombine of local subpages; (2) by clearing atomic-modified bits on pages that have not been modified and that contain no pages in atomic state; (3) by asking another processing cell to take ownership of a page; and (4) by copying a page out to disk.

Figure 11:
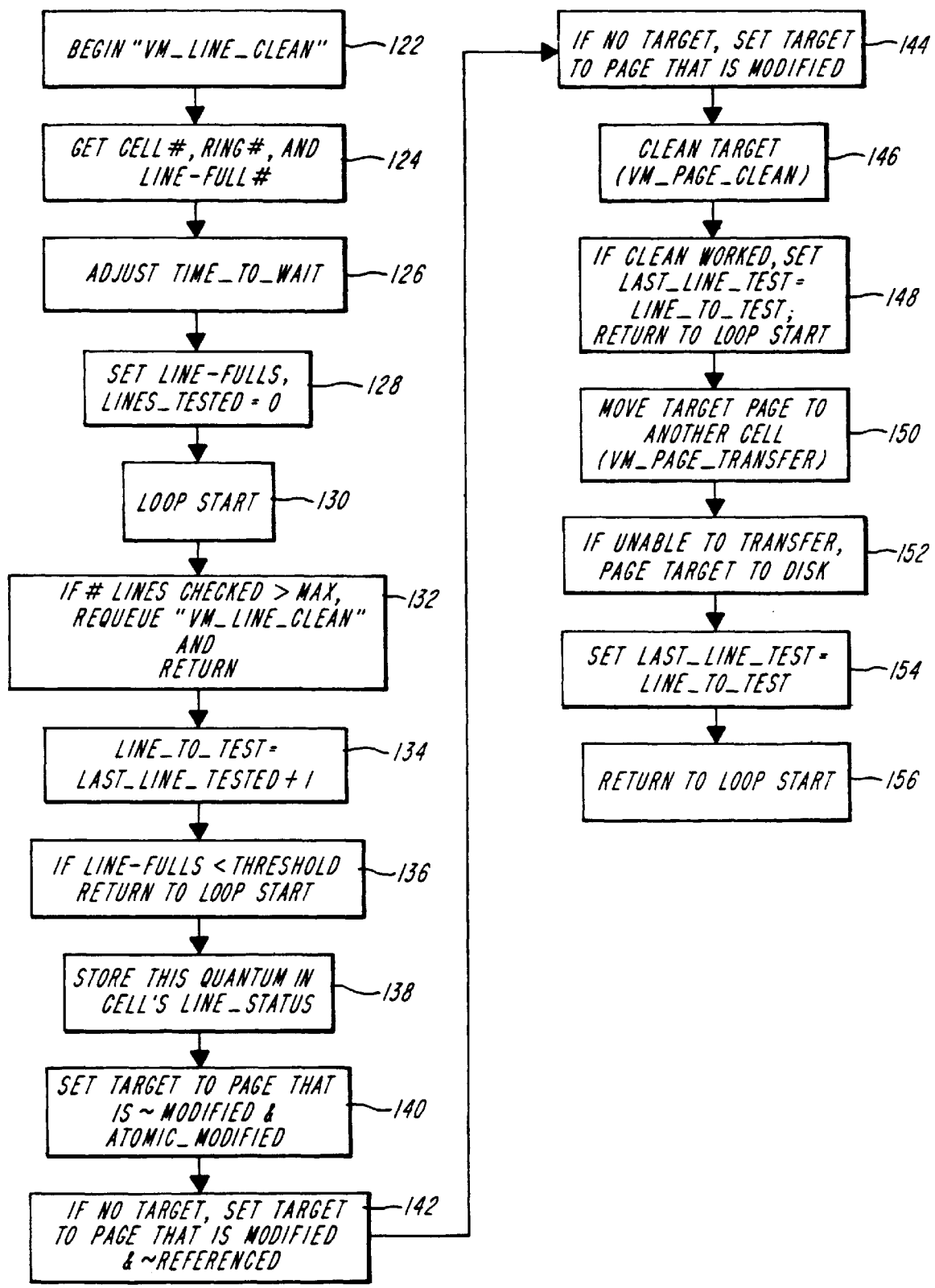

A preferred sequence of steps for VM—CLEAN—LINE is depicted in FIG. 11, beginning at step 122.

| Step | Operation |
|---|---|
| 122 | Begin. |
| 124 | Get the processing cell's ring number. Also get number of line-fulls (see Figure 6) for this processing cell. |
| 126 | If the total number of line-fulls, for this processing cell (from the processing cell structure), since the last time this ran is greater than VM_LINE_FULL_TOT_HIGH, do:<br>A) If time_to_wait is greater than VM_CLEAN_DELAY_MIN, decrease it by VM_CLEAN_DELAY_DELTA.<br>If the total number of line-fulls, for this processing cell (from the processing cell structure), since the last time this ran is less than VM_LINE_FULL_TOT_LOW, do:<br>A) If time_to_wait is less than VM_CLEAN_DELAY_MAX, increase it by VM_CLEAN_DELAY DELTA. |
| 128 | Set the total number of line-fulls for the processing cell to zero. Set num_lines_tested to zero. |
| 130 | Loop start. |
| 132 | If num_lines_tested equals VM_LINE_TEST_MAX do:<br>A) Call timeout to put VM_CLEAN_LINE back on the callout queue.<br>B) Return. |
| 134 | Set line_to_test to processing cell last_line_tested + 1. |
| 136 | If the number of line fulls for this line in this quantum and in the last quantum are both lower than VM_LINE_FULL_THRESH do:<br>A) Set processing cell last_line tested to line_to_test.<br>B) Go back to step 130. |
| 138 | If a full time quantum has passed since the last time this code ran, do:<br>A) In this processing cell's line_status, set last_quantum to this_quantum.<br>B) In this processing cell's line_status, set this_quantum to zero. |
| 140 | Issue a find-page-local instruction to try to find a page in the line that is not modified but has atomic-modified set. If one is found, it is the target page. |
| 142 | If no target page has been found, issue a find-page-local instruction to try to find a page in the line that is modified but does not have the referenced bit set. If one is found, it is the target page. |
| 144 | If no target page has been found, issue a find-page-local instruction to get a modified page in the line. |
| 146 | Call VM_PAGE_CLEAN to try to move the page to another processing cell. |
| 148 | If VM_PAGE_CLEAN succeeded, do:<br>A) Set processing cell last_line tested to line_to_test.<br>B) Go back to step 130. |
| 150 | Call VM_PAGE_TRANSFER to try to move the page to another processing cell. |
| 152 | If unable to transfer the page to another processing cell, copy the page out to its device. |
| 154 | Set processing cell last_line_tested to line_to_test. |
| 156 | Go back to step 130. |

VM PAGE SELECT

The procedure VM—PAGE—SELECT determines which page in a line should be the next to be purified. The procedure accepts as input the line to be searched, and returns as output a candidate page.

The steps of the procedure are as follows

1) Issue a find page local instruction selecting for the reference bit set, the modified bit set, held bit not set, anchor bit not set, and not all subpages owned by this processing cell.

2) If no page was found, then issue a find page local instruction selecting for atomic_modified set, the modified bit not set, held bit not set, anchor bit not set, and none of the subpages in atomic or transient atomic state.

3) If no page was found, then issue a find page local instruction selecting for the reference bit not set, the modified bit set, held bit not set, anchor bit not set, and not all subpages owned by this processing cell.

4) If no page was found, then issue a find page local instruction selecting for the held bit not set and the anchor bit not set.

5) If still no page was found call time slee p.

6) Gobackto step 1.

Constants

The constants referred to in the description above can be varied in order to improve performance depending on the configuration and usage of a particular system. An illustrative set of values for the respective constants is set forth below.

| | |
|---|---|
| VM_CLEAN_DELAY_MIN = | 50 msec |
| VM_CLEAN_DELAY_MAX = | 5 sec |
| VM_LINE_FULL_THRESH = | 2 (Minimum # of line-fulls per quantum to cause background cleaning to take place.) |
| VM_LINE_FULL_RATE_TARGET = | 1 (Maximum # of line fulls/quantum to allow a processing cell to be a candidate to take a page.) |
| VM_LINE_FULL_TOT_HIGH = | 4 |
| VM_LINE_FULL_TOT_LOW = | 1 |
| VM_LINE_TEST_MAXIMUM = | 32 (Maximum number of lines to be examined in one pass of the vm_daemon code.) |

Wired Pages

At least one page in each processing cell, e.g., 18A, 18B and 18C, of the system 10 is reserved by setting the "held" bit of its descriptor, i.e., descriptor.held and setting the "wired" bit in the page entry. That page is used to store those portions of the operating system necessary to resolve line-full faults, as described above. This is necessary to preclude a line-full deadlock, i.e., a conflict between two (or more) processing cells having the same line-full condition.

While the reserved pages discussed in the preceding paragraph can be used to store instructions of the operating system kernel, i.e., "text" page, pages can also be reserved by individual processing cells to store, for example, portions of operating system data.

To prevent a proliferation of held pages on any one processing cell, the virtual memory system preferably distributes those pages in the same manner that it distributes pages among multiple processing cells to resolve line-full faults. Therefore, any full page of kernel data may, for example, reside on a subset of the processing cells in the system.

Particularly, referring to FIG. 6, it is seen that the CELL STATUS array holds, within the LINE STATUS entries, the number of pages reserved in "wired" status by the corresponding processing cell. During the page-cleaning process executed by the procedure VM—CLEAN—LINE, the virtual memory system can identify processing cells with more then a predetermined number of wired pages. Selected held pages, for example, those holding system data (as opposed to system code or text) can be then moved to processing cells having fewer ones of those pages.

Figure 12:
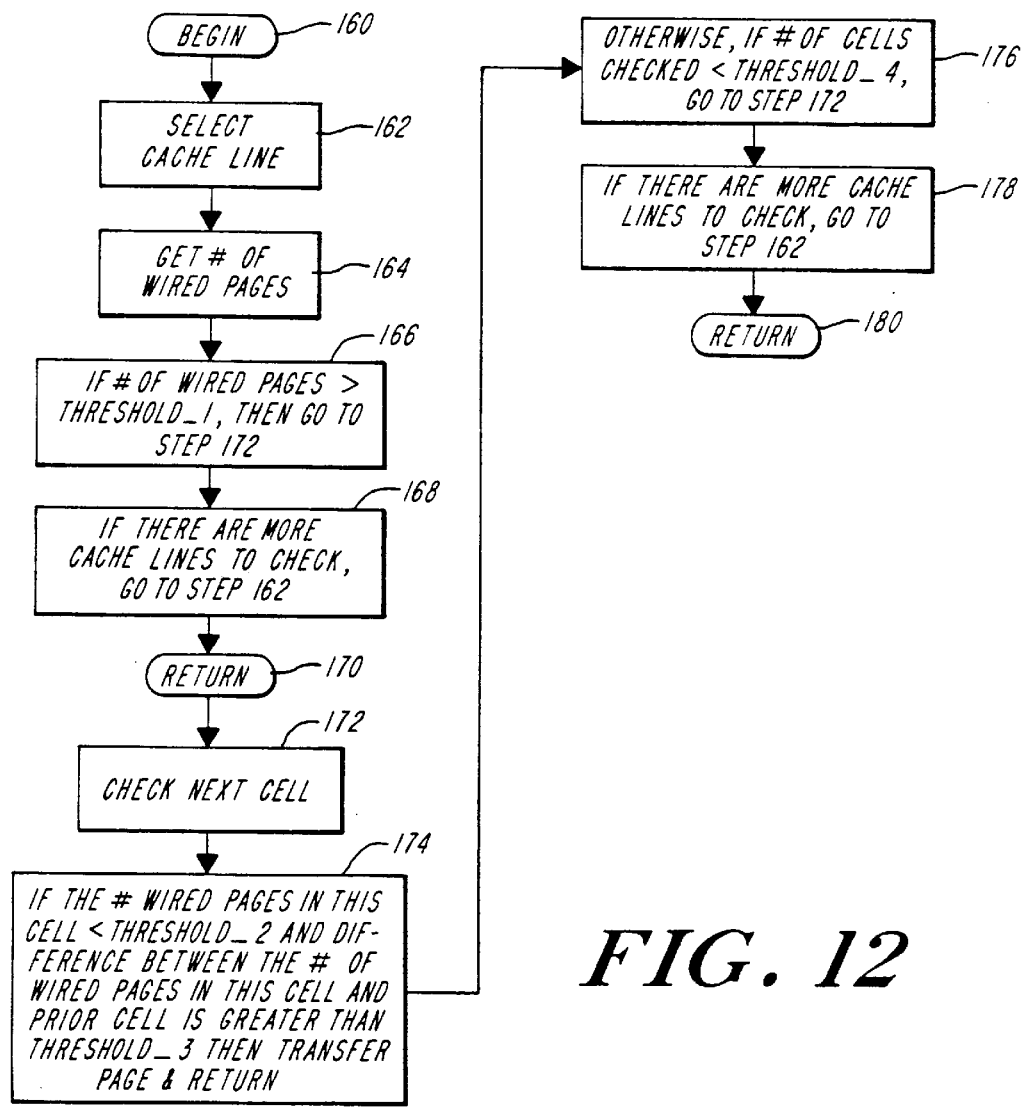
FIG. 12 depicts a preferred sequence of steps taken by a processing cell to transfer "wired" pages between processing cells within the multiprocessing system of FIG. 1.

A preferred sequence of steps for distributing wired pages is depicted in FIG. 12, beginning at step 160.

| Step | Operation |
|------|-----------|
| 160 | Begin. |
| 162 | Select candidate cache line. |
| 164 | Determine the number of wired pages in the candidate. |
| 166 | If the number of wired pages is greater than a first threshold value, then go to step 172. |
| 168 | If there are more cache lines to check, go to step 162. |
| 170 | Return. |
| 172 | Check the next processing cell. |
| 174 | If (a) the number of wired pages in that next processing cell is less than a second threshold value, and (b) the difference between the number of wired pages in that next processing cell and the number of wired pages in the prior processing cell is less than a third threshold value; then transfer a wired page from the prior processing cell to that next processing cell, and return. |
| 176 | If the number of processing cells checked is less than a fourth threshold value, then go to step 172. |
| 178 | If there are more cache lines to check, go to step 162. |
| 180 | Return. |

Summary

The foregoing describes an improved digital data processing system meeting the aforementioned objects. Particularly, it describes a digital data processing system that efficiently manages data allocation among plural distributed memory elements. Those skilled in the art will appreciate that the embodiments described above are exemplary only, and that other apparatuses and methods—including modifications, additions and deletions—fall within the scope and spirit of the invention.

By way of example, it will be appreciated that the teachings above may be applied to other distributed memory multiprocessor systems, for example, of the type described, e.g., ones having different ring configuration.

By way of further example, it will be appreciated that different data structures than those described herein may be used for storing the commitment status of the cache lines. In addition, it will be appreciated that procedures which differ in detail from those described herein may be used to transfer data between corresponding lines of the caches. And, by way of further example, it will be appreciated that parameters used to determine which pages to transfer between cache lines and which caches to transfer those pages to may be varied in accordance with the needs and requirements of a particular embodiment.

In view of the foregoing, what we claim is:

1. A digital data processor comprising a plurality of processing cells interconnected by a network,
   A. each processing cell including an associated memory element having a plurality of sets, each set storing at least one page, each set maintained by the memory element of each processing cell corresponding to a respective one of said sets maintained by the memory element of each of said other processing cells,
   B. one of said processing cells, as a first processing cell, including
      i a page distributor for determining when a first one of said sets in the associated memory element reaches a predetermined storage commitment condition; and
      ii a page-transfer element for generating and transmitting to a selected one of said other processing cells, as a candidate processing cell, a transfer request signal for a selected page in said first one of said sets in response to said page distributor determining that said first one of said sets has reached said predetermined storage commitment condition;
   C. said candidate processing cell including a take-ownership element responsive to the transfer request signal for generating a request for ownership access to said selected page.

2. A digital data processor according to claim 1, further comprising a control unit coupled to said first processing cell and to said candidate processing cell for responding to said ownership request signal for
   i) allocating storage space for said selected page within one of said sets maintained by the memory element of said candidate processing cell,
   ii) transferring said selected page from said first processing cell to said candidate processing cell for storage in said storage space, and
   iii) deallocating storage space in said first one of said sets maintained by the memory element of said first processing cell in which said selected page had been stored.

3. A digital data processor according to claim 2, wherein
   A. said first processing cell includes a processor for generating an allocation request for requesting allocation of said selected page in the memory element of said first processing cell,
   B. said control unit responds to said allocation request for generating a line-full signal, and
   C. said page distributor responds to said line-full signal for invoking said page-transfer element.

4. A digital data processor according to claim 3, wherein said control unit generates said line-full signal in response to a request to allocate said selected page in a filled set of one of said memory element that is full.

5. A digital data processor according to claim 1, further comprising a table for storing a status indicator indicating one of a plurality of status conditions of an associated one of said sets within the memory element of each said processing cell.

6. A digital data processor according to claim 5, wherein said page distributor invokes the page-transfer element in response to said table having a status indicator indicating a selected one of said status conditions.

7. A digital data processor according to claim 5, wherein said status indicator represents a count of times the associated one of said sets becomes filled within a predetermined time interval.

8. A digital data processor according to claim 7, wherein
   A. said first processing cell includes an allocation requestor for generating allocation requests requesting allocation of said selected page in its associated memory element,
   B. said processor includes a control unit for generating a line-full signal in response to selected ones of said allocation requests,
   C. said digital data processor further includes a table control for incrementing the status indicator associated with one of said sets in response to the line-full signal being generated for said one of said sets.

9. A digital data processor according to claim 7, wherein said page distributor includes a line-clean element for invoking said page-transfer element in response to the count becoming greater than a predetermined value within said designated time interval.

10. A digital data processor according to claim 1, wherein said page distributor includes a page selector for selecting said selected page to transfer.

11. A digital data processor according to claim 10, wherein said page selector includes selects for transfer selected ones of the modified pages for which no portion thereof is stored in a cache for use by a processor associated therewith.

12. A digital data processor according to claim 10, further comprising a held page control for preventing said selected page in a set from being selected for transfer.

13. A digital data processor according to claim 12, wherein said selected page stores selected instructions for operation of said digital data processor.

14. A digital data processor according to claim 12 wherein said selected page stores instructions for operation of said distribution means.

15. A digital data processor according to claim 1, wherein said page distributor includes a candidate processing cell selector for selecting one of said processing cells as said candidate processing cell in response to a value of a predetermined parameter.

16. A digital data processor according to claim 15, wherein said processing cell selector selects said candidate processing cell in accord with a search of one or more processing cells local to said first processing cell.

17. A digital data processor according to claim 15, wherein said processing cell selector selects said candidate processing cell based on a search of ones of said processing cells which are not local to said first processing cell in response to a failure to identify said candidate processing cell from among processing cells which are local to said first processing cell.

18. A digital data processor according to any one of claims 1–17, further comprising
  A. a secondary data store for providing secondary storage;
  B. said page distributor being responsive to a failure to transfer a said page to a candidate processing cell within a specified period after the associated memory element reaches said predetermined storage commitment condition for copying said page to said secondary data store.

19. A method of operating a digital data processor comprising a plurality of processing cells interconnected by a network, each processing cell including an associated memory element having a plurality sets, each set storing a page, each said set corresponding to a respective set of the memory element of each of other processing cell, at least one processing cell, as a first processing cell, including a page distributor for determining when a first one of said sets in the associated memory element reaches a predetermined storage commitment condition, the method comprising the steps of
  A. determining when at least a first one of said sets in the memory element of a first processing cell reaches a predetermined storage commitment condition and in response thereto generating and transmitting to a selected one of said other processing cells, as a candidate processing cell a transfer request signal for a selected page in said first one of said sets to initiate transfer of said selected page from said first one of said sets to the corresponding set in the memory element of one of said candidate processing cell, and
  D. enabling said candidate processing cell to generate a request for ownership access to said selected page in response to such transfer request signal.

20. A method according to claim 19, further comprising the step of responding to said ownership request signal by
  i) allocating storage space for said selected page within a set of the memory element of said candidate processing cell,
  ii) transferring said selected page from said first processing cell to said candidate processing cell for storage in said storage space, and
  iii) deallocating storage space in said first one of said sets maintained by the memory element of said first processing cell in which said selected page had been stored.

21. A method according to claim 20, further comprising the steps of
  A. generating an allocation request for requesting allocation of a page in the memory element of said first processing cell,
  B. responding to said allocation request for generating a line-full signal,
  C. responding to said line-full signal for performing said selected page transferring step.

22. A method according to claim 21, comprising the step of generating said line-full signal in response to a request to allocate a page in a filled set of a memory element.

23. A method according to claim 19, comprising the step of storing status for each of the corresponding sets within the memory elements of said processing cells.

24. A method according to claim 23, the system further including a table having associated with each set a count value, the method further comprising the steps of
  A. requesting allocation of a page in the memory element of said first processing cell,
  B. generating a line-full signal in response to selected ones of said allocation requests, and
  C. responding to said line-full signal by incrementing the count of the corresponding set.

25. A method according to claim 24, further comprising the step of responding to the count value becoming greater than a predetermined value within said designated time interval by initiating a page-transfer step to transfer said selected page to said candidate processing cell.

26. A method according to claim 19, wherein said selected page is selected in accord with at least one predetermined parameter.

27. A method according to claim 19, further comprising the step of identifying said candidate processing cell from among said other cells based on at least one predetermined parameter.

28. A method according to claim 27, further comprising the step of selecting said candidate processing cell in accord with a search of one or more processing cells which are local to said first processing cell.

29. A method according to claim 28, further comprising the step of selecting said candidate processing cell based on a search of at least selected processing cells which are not local to said first processing cell in response to a failure to identify said candidate cell from among processing cells which are local to said first processing cell.

30. A method according to any one of claims 19–29, said system further including a secondary data store providing secondary storage of at least a portion of a said page, the method further comprising the step of responding to a failure to transfer said selected page to said candidate processing cell within a specified period after the associated memory element reaches said predetermined storage commitment condition for copying said selected page to said secondary data store.

* * * * *